US010222540B2

(12) United States Patent
Hikmet et al.

(10) Patent No.: US 10,222,540 B2
(45) Date of Patent: Mar. 5, 2019

(54) LIGHT EMITTING DEVICE

(71) Applicant: PHILIPS LIGHTING HOLDING B.V., Eindhoven (NL)

(72) Inventors: Rifat Ata Mustafa Hikmet, Eindhoven (NL); Ties Van Bommel, Horst (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 488 days.

(21) Appl. No.: 14/898,485

(22) PCT Filed: Jun. 19, 2014

(86) PCT No.: PCT/EP2014/062951
§ 371 (c)(1),
(2) Date: Dec. 15, 2015

(87) PCT Pub. No.: WO2014/202726
PCT Pub. Date: Dec. 24, 2014

(65) Prior Publication Data
US 2016/0139328 A1 May 19, 2016

(30) Foreign Application Priority Data
Jun. 20, 2013 (EP) .................................. 13173030

(51) Int. Cl.
*F21V 8/00* (2006.01)
*G03B 21/16* (2006.01)
(Continued)

(52) U.S. Cl.
CPC ............ *G02B 6/0085* (2013.01); *F21S 41/13* (2018.01); *F21S 41/14* (2018.01); *F21S 41/141* (2018.01);
(Continued)

(58) Field of Classification Search
CPC .. G02B 6/0085; G02B 6/0003; G02B 6/0031; G02B 6/0035; G02B 6/0026
See application file for complete search history.

(56) References Cited

U.S. PATENT DOCUMENTS 8,008,845 B2  8/2011  Van De Ven et al.
2002/0076158 A1  6/2002  Murali
(Continued)

FOREIGN PATENT DOCUMENTS

EP         2346101 A1  7/2011
WO    2007036877 A2  4/2007

*Primary Examiner* — Anabel Ton
(74) *Attorney, Agent, or Firm* — Akarsh P. Belagodu

(57) ABSTRACT

A light emitting device (1) is provided comprising a light source (2) adapted for, in operation, emitting light (13) with a first spectral distribution, a first luminescent light guide (4) comprising a first light input surface (41) and a first light exit surface (42) extending at an angle different from zero to one another, and being adapted for receiving the light (13) with the first spectral distribution at the first light input surface (41), converting the light (13) with the first spectral distribution to light (14) with a second spectral distribution, guiding the light (14) with the second spectral distribution to the first light exit surface (42) and coupling the light (14) with the second spectral distribution out of the first light exit surface (42), and a first transparent heat sink element (3) arranged adjacent to at least one surface of the first luminescent light guide (4) and in the optical path between the light source (2) and the first luminescent light guide (4), the at least one surface being different from the light exit surface (42), wherein the first transparent heat sink element (3) is adapted for redirecting light by means of any one of refraction and diffraction.

15 Claims, 12 Drawing Sheets

(51) Int. Cl.
| | | |
|---|---|---|
| *G03B 21/20* | (2006.01) | |
| *F21S 41/13* | (2018.01) | |
| *F21S 41/14* | (2018.01) | |
| *F21S 41/141* | (2018.01) | |
| *F21S 41/155* | (2018.01) | |
| *F21S 41/20* | (2018.01) | |
| *F21S 41/24* | (2018.01) | |
| *F21S 43/14* | (2018.01) | |
| *F21S 43/145* | (2018.01) | |
| *F21S 43/20* | (2018.01) | |
| *F21S 43/237* | (2018.01) | |
| *F21S 43/239* | (2018.01) | |
| *F21S 43/243* | (2018.01) | |
| *F21S 43/249* | (2018.01) | |
| *F21S 45/47* | (2018.01) | |
| *F21S 41/16* | (2018.01) | |

(52) U.S. Cl.
CPC ............. *F21S 41/155* (2018.01); *F21S 41/16* (2018.01); *F21S 41/24* (2018.01); *F21S 41/285* (2018.01); *F21S 43/14* (2018.01); *F21S 43/145* (2018.01); *F21S 43/237* (2018.01); *F21S 43/239* (2018.01); *F21S 43/243* (2018.01); *F21S 43/249* (2018.01); *F21S 43/255* (2018.01); *F21S 45/47* (2018.01); *G02B 6/0003* (2013.01); *G02B 6/003* (2013.01); *G02B 6/005* (2013.01); *G02B 6/0026* (2013.01); *G02B 6/0031* (2013.01); *G02B 6/0035* (2013.01); *G02B 6/0065* (2013.01); *G02B 6/0073* (2013.01); *G03B 21/16* (2013.01); *G03B 21/204* (2013.01); *G02B 6/0068* (2013.01)

(56) References Cited

U.S. PATENT DOCUMENTS

| | | |
|---|---|---|
| 2004/0116033 A1 | 6/2004 | Ouderkirk et al. |
| 2007/0139949 A1 | 6/2007 | Tanda et al. |
| 2008/0179622 A1 | 7/2008 | Herrmann |
| 2008/0191236 A1 | 8/2008 | De Graaf et al. |
| 2009/0322208 A1 | 12/2009 | Shaikevitch et al. |
| 2010/0002414 A1 | 1/2010 | Meir et al. |
| 2010/0102697 A1 | 4/2010 | Van De Ven et al. |
| 2011/0018020 A1 | 1/2011 | Jagt |
| 2011/0062469 A1* | 3/2011 | Camras ............ H01L 33/58 257/98 |
| 2011/0121703 A1 | 5/2011 | Karlicek, Jr. et al. |
| 2011/0210369 A1 | 9/2011 | Daicho et al. |
| 2012/0020020 A1 | 1/2012 | Julien et al. |
| 2013/0063924 A1 | 3/2013 | Pickard |
| 2013/0099264 A1* | 4/2013 | Zimmerman ......... H01L 33/64 257/89 |

\* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2014/062951, filed on Jun. 19, 2014, which claims the benefit of European Patent Application No. 13173030.1, filed on Jun. 20, 2013. These applications are hereby incorporated by reference herein.

FIELD OF THE INVENTION

The invention relates to a light emitting device comprising a light guide and a transparent heat sink element.

BACKGROUND OF THE INVENTION

U.S. Pat. No. 8,008,845 B2 discloses a lighting device in the form of an encapsuled LED arranged in a transparent heat sink with a back reflector and a positive and a negative terminal on the front side. Light emitted by the LED passes through at least a part of the transparent heat sink before exiting the lighting device.

High brightness light sources are interesting for various applications including spots and digital light projection. For this purpose, it is possible to make use of light guides in which shorter wavelength light is converted to longer wavelengths in a highly transparent luminescent material. A light guide of such a transparent luminescent material is illuminated by LEDs to produce longer wavelengths within the light guide. Converted light which is in the light guide can then be extracted from one of the surfaces thereby leading to an intensity gain.

It is thus desired to increase the light density falling onto the light guide in order to obtain higher output intensity. However, the distribution and spreading of the heat dissipated inside the light guide limits the maximum obtainable light intensity severely.

Also, the excess heat will lead to a poor optical performance, for example due to thermal quenching, and might cause reliability issues.

EP2346101A1 discloses a light emitting module wherein an optical wavelength conversion ceramic, provide with a reflective film, converts the wavelength emitted by a semiconductor light emitting element. The emission area of the light which passed through the optical wavelength conversion ceramic is narrowed to be smaller than the light emission area of the semiconductor light emitting element. The reflective element guides the light so that light is emitted roughly parallel to the light emitting surface of the semiconductor light emitting element.

SUMMARY OF THE INVENTION

It is an object of the present invention to overcome this problem, and to provide a light emitting device with which the excess heat in the light guide is reduced to achieve an improvement of the optical performance, and with which higher intensity and intensity gain may be achieved.

According to a first aspect of the invention, this and other objects are achieved by means of a light emitting device comprising a light source adapted for, in operation, emitting light with a first spectral distribution, a first luminescent light guide comprising a first light input surface and a first light exit surface extending at an angle different from zero to one another, and the first luminescent light guide being adapted for receiving the light with the first spectral distribution at the first light input surface, converting at least a part of the light with the first spectral distribution to light with a second spectral distribution, guiding light with the second spectral distribution to the first light exit surface and coupling the light with the second spectral distribution out of the first light exit surface, and a first transparent heat sink element arranged adjacent to at least one surface of the first luminescent light guide and arranged in the optical path between the light source and the first luminescent light guide, the at least one surface being different from the light exit surface, wherein the first transparent heat sink element is adapted for redirecting light by means of any one of refraction and diffraction.

By providing a light guide being adapted for converting at least a part of the light with the first spectral distribution to light with a second spectral distribution and being made of a garnet, a light guide is provided with which a particularly large amount of the converted light will stay in the garnet and thus the light guide and can then be extracted from one of the surfaces, which in turn leads to a particularly high intensity gain.

By providing a first transparent heat sink element adjacent the first luminescent light guide a considerable improvement in the dissipation of heat away from the light guide is obtained, thus increasing the maximum obtainable output light intensity of the light emitting device considerably. Furthermore, the adverse effects on the optical performance due to, for example, thermal quenching are lowered significantly or even eliminated, which provides for a considerably more reliable light emitting device with an improved optical performance.

The first light input surface and the first light exit surface of the first luminescent light guide extend at an angle different from zero to one another, i.e. the surfaces are not orientated in parallel. This may give more freedom of design for the first luminescent light guide, for example the first light input surface may have a larger area than the first light exit surface. In an example the first light exit surface is perpendicular to the first light input surface.

By arranging the first transparent heat sink element in the optical path between the light source and the first luminescent light guide, heat emitted by the light sources is directed away from the light guide in such a way that at least a majority of the heat will not enter the light guide, which in turn provides for a light emitting device in which the light guide is particularly well protected from the heat emitted by the light sources.

By adapting the first transparent heat sink element for redirecting light by means of any one of refraction and diffraction, a light emitting device is provided with which the first transparent heat sink element is adapted for functioning as a coupling element by means of which light emitted by the light sources is collected and guided towards the light guide in a particularly efficient and well-functioning manner and with little or no light loss. Also, the amount of light coupled into the first luminescent light guide may be tuned by altering the shape of such a first transparent heat sink element.

According to an embodiment the first transparent heat sink element is made of a material having a thermal conductivity which is larger than 1 W/(K*m), larger than 10 W/(K*m) or even larger than 20 W/(K*m).

Thereby a particularly good dissipation of heat away from the light guide is obtained. It is noted that in general a larger thermal conductivity leads to a better heat dissipation.

According to an embodiment one or more surfaces of the first luminescent light guide other than the first light input surface and the first light exit surface are provided with a reflective layer. This reduces light that may escape from the one or more surfaces other than the first light exit surface and increases the efficiency and the light output of the light emitting device.

According to an embodiment the first luminescent light guide is made of a luminescent material chosen from a group comprising luminescent garnets, luminescent doped garnets, transparent luminescent materials, luminescent light concentrating materials, and combinations thereof. Thereby a light emitting device having a light guide with particularly good wavelength conversion properties is provided.

According to an embodiment a gap is provided between the first transparent heat sink element and the first luminescent light guide. Such a gap results in that an even larger portion of the heat will not enter the light guide as further heat is transported away through the gap, which in turn provides for a light emitting device in which the light guide is even better protected from the heat emitted by the light sources.

According to an embodiment the gap between the first transparent heat sink element and the first luminescent light guide comprises any one or more of air and an optical adhesive. By providing such a material in the gap it is ensured that very little or even no light loss occurs when light is transmitted through the gap and which is to be coupled into the light guide. Furthermore, and particularly when the gap comprises an optical adhesive, a considerably more robust light emitting device is obtained.

According to an embodiment the first transparent heat sink element comprises any one or more of a coupling structure, which is arranged on or at a surface extending parallel to and opposite the first light exit surface, and a scattering material. By providing a scattering material, a light emitting device is provided with which light is scattered in the first transparent heat sink element and with which scattered light is thus coupled into the light guide. Consequently, light may be extracted from the light guide in a particularly efficient manner and a uniform light distribution as perceived by a viewer may be obtained. By providing a coupling structure, a light emitting device is provided with which light emitted by the light source may be coupled into the first luminescent light guide in a particularly efficient manner and with particularly low or possibly no coupling losses.

According to an embodiment the first transparent heat sink element has a trapezoid cross-sectional shape having two oppositely tapered side surfaces. In this way the first transparent heat sink element functions as an optical element redirecting the light by means of refraction. Thereby the amount of light lost during transmission through the first transparent heat sink element is reduced.

According to an embodiment the first transparent heat sink element extends adjacent to at least two surfaces of the first luminescent light guide. Thereby a light emitting device is provided having further improved heat dissipation properties as the area and/or volume available for dissipating heat is increased. In a further embodiment the first transparent heat sink element is extending adjacent four sides of the first luminescent light guide and has a triangular cross-sectional shape and in which light sources are provided on all three sides of the first transparent heat sink element. The first transparent heat sink element is thus illuminated from three different angles. Thereby more light may be coupled into the first luminescent light guide, thus leading to an even higher intensity gain.

According to an embodiment the transparent material of the first transparent heat sink element is chosen from the group comprising sapphire, un-doped transparent garnets such as YAG, LuAG, glass, quartz, ceramic materials such as polycrystalline alumina, luminescent materials, phosphors and combinations thereof. Thereby a light emitting device is provided having a first transparent heat sink element made of a highly transparent material with a high heat conductivity, thus allowing light from the light sources to pass through with very small or even no loss of light while simultaneously ensuring excellent heat dissipation. Depending on the position of the transparent heat sink, the transparent material preferably shows a high transparency, in other words it should not scatter light. In the case where the luminescent light guide is in optical contact with the transparent heat sink, the transparent heat sink preferably has a high transparency and creates a minimal or no scattering. In configurations where partial and/or no optical contact is present between the transparent heat sink and the luminescent light guide the transparency may be lower.

In this context, a material being highly transparent is intended to be a material showing almost no absorbance in the spectral ranges of excitation and emission, and further showing direct beam transparency of more than 85%, more than 90%, more than 95% or even more than 98% (i.e. the fraction of a parallel beam of light scattered to angles higher than 2 degrees is less than 15%, less than 10%, less than 5% or even less than 2%).

According to an embodiment the light emitting device further comprises a second transparent heat sink element arranged adjacent to a surface of the first luminescent light guide which is facing away from said first transparent heat sink element.

According to an embodiment the light source is arranged on a base, the base being a non-transparent heat sink.

According to an embodiment a non-transparent heat sink is provided arranged in any one or more of physical and thermal contact with any one or more of the first transparent heat sink element and the first luminescent light guide.

According to an embodiment the non-transparent heat sink is arranged such as to surround the light emitting device at least partially. The non-transparent heat sink may be reflective or may comprise a reflective coating.

By way of any one or more of the previous four embodiments a light emitting device is provided having further improved heat dissipation properties as further heat dissipating means is provided thereby significantly increasing the area and/or volume available for dissipating heat.

The invention also concerns a projector, lamp or luminaire comprising a light emitting device according to the invention.

It is noted that the invention relates to all possible combinations of features recited in the claims.

Figure 1:
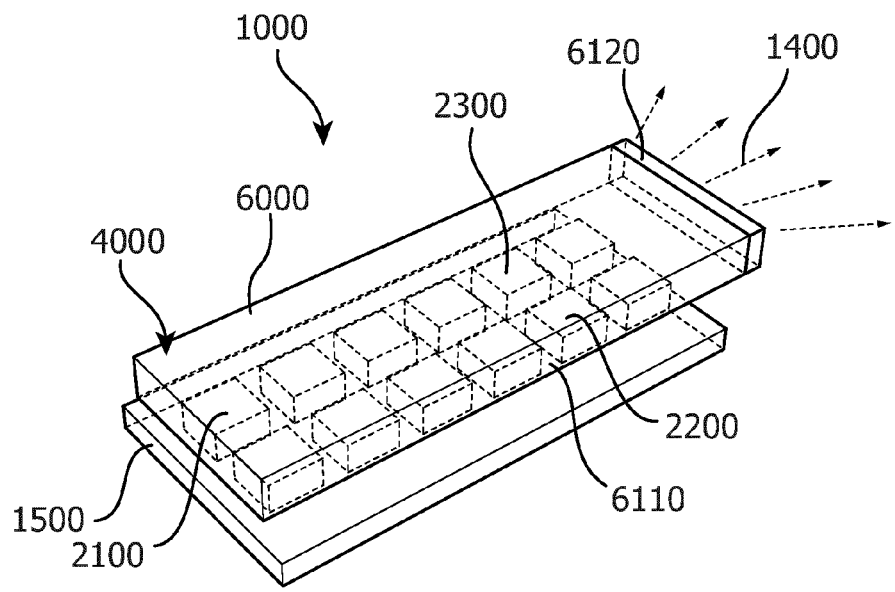
FIG. 1 shows a 3-dimensional perspective view of a light emitting device comprising an exit phosphor.

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral. With regard to FIGS. 1 to 10 showing a number of features and elements which may be added to any one of the embodiments of a light emitting device according to the invention as set forth further below, generally "00" has been added to all elements except those specific to one of these Figures.

DETAILED DESCRIPTION

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral. With regard to FIGS. 1 to 10 showing a number of features and elements which may be added to any one of the embodiments of a light emitting device according to the invention as set forth further below, generally "00" has been added to all elements except those specific to one of these Figures.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The following description will start with general considerations regarding applications, suitable light sources and suitable materials for various elements and features of a light emitting device according to the invention. For this purpose a number of features and elements which may be added to any one of the embodiments of a light emitting device according to the invention as set forth further below will be described with reference to FIGS. 1 to 10. The specific embodiments of a light emitting device according to the invention will be described in detail with reference to FIGS. 11 to 19.

A light emitting device according to the invention may be used in applications including but not being limited to a lamp, a light module, a luminaire, a spot light, a flash light, a projector, a digital projection device, automotive lighting such as e.g. a headlight or a taillight of a motor vehicle, arena lighting, theater lighting and architectural lighting.

Light sources which are part of the embodiments according to the invention as set forth below, are adapted for, in operation, emitting light with a first spectral distribution. This light is subsequently coupled into a light guide or waveguide. The light guide or waveguide may convert the light of the first spectral distribution to another spectral distribution and guides the light to an exit surface. The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs. The LED may in principle be an LED of any color, but is in an embodiment a blue light source producing light source light in the blue color-range which is defined as a wavelength range of between 380 nm and 495 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light source may be a red light source, i.e. emitting in a wavelength range of e.g. between 600 nm and 800 nm. Such a red light source may be e.g. a light source of any of the above mentioned types directly emitting red light or provided with a phosphor suitable for converting the light source light to red light. This embodiment is particularly advantageous in combination with a light guide adapted for converting the light source light to infrared (IR) light, i.e. light with a wavelength of more than about 800 nm and in a suitable embodiment with a peak intensity in the range from 810 to 850 nm. In an embodiment such a light guide comprises an IR emitting phosphor. A light emitting device with these characteristics is especially advantageous for use in night vision systems, but may also be used in any of the applications mentioned above.

The light guides as set forth below in embodiments according to the invention generally may be rod shaped or bar shaped light guides comprising a height H, a width W, and a length L extending in mutually perpendicular directions and are in embodiments transparent, or transparent and luminescent. The light is guided generally in the length L direction. The height H is preferably <10 mm, more preferably <5 mm, most preferably <2 mm. The width W is preferably <10 mm, more preferably <5 mm, most preferably <2 mm. The length L is preferably larger than the width W and the height H, more preferably at least 2 times the width W or 2 times the height H, most preferably at least 3 times the width W or 3 times the height H. The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

The generally rod shaped or bar shaped light guide can have any cross sectional shape, but in embodiments has a cross section the shape of a square, rectangle, round, oval, triangle, pentagon, or hexagon. Generally the light guides are cuboid, but may be provided with a different shape than a cuboid, with the light input surface having somewhat the shape of a trapezoid. By doing so, the light flux may be even enhanced, which may be advantageous for some applications.

The light guides may also be cylindrically shaped rods. In embodiments the cylindrically shaped rods have one flattened surface along the longitudinal direction of the rod and at which the light sources may be positioned for efficient incoupling of light emitted by the light sources into the light guide. The flattened surface may also be used for placing heat sinks. The cylindrical light guide may also have two flattened surfaces, for example located opposite to each other or positioned perpendicular to each other. In embodiments the flattened surface extends along a part of the longitudinal direction of the cylindrical rod.

The light guides as set forth below in embodiments according to the invention may also be folded, bended and/or shaped in the length direction such that the light guide is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light guide of which the total length, along which generally the light is guided, is relatively large, leading to a relatively high lumen output, but can at the same time be arranged into a relatively small space. For example luminescent parts of the light guide may be rigid while transparent parts of the light guide are flexible to provide for the shaping of the light guide along its length direction. The light sources may be placed anywhere along the length of the folded, bended and/or shaped light guide.

Suitable materials for the light guides as set forth below according to embodiments of the invention are sapphire, polycrystalline alumina and/or undoped transparent garnets such as YAG, LuAG having a refractive index of n=1.7. An additional advantage of this material (above e.g. glass) is that it has a good thermal conductivity, thus diminishing local heating. Other suitable materials include, but are not limited to, glass, quartz and transparent polymers. In other embodiments the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

The light guides as set forth below according to embodiments of the invention may comprise a suitable luminescent material for converting the light to another spectral distribution. Suitable luminescent materials include inorganic phosphors, such as doped YAG, LuAG, organic phosphors, organic fluorescent dyes and quantum dots which are highly suitable for the purposes of embodiments of the present invention as set forth below.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The luminescent material may also be an inorganic phosphor. Examples of inorganic phosphor materials include, but are not limited to, cerium (Ce) doped YAG ($Y_3Al_5O_{12}$) or LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3$:Eux wherein $0<x\leq1$, preferably $0<x\leq0.2$; and BSSN being $Ba_{2-x-z}M_xSi_{5-y}Al_yN_{8-y}O_y$:$Eu_z$ wherein M represents Sr or Ca, $0\leq x\leq1$, $0\leq y\leq4$, and $0.0005\leq z\leq0.05$, and preferably $0\leq x\leq0.2$.

In embodiments of the invention as set forth below, the luminescent material is made of material selected from the group comprising $(M<I>_{(1-x-y)}M<II>_x M<III>_y)_3 (M<IV>_{(1-z)}M<V>_z)_5O_{12}$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0<x\leq1$, $0<y\leq0.1$, $0<z<1$, $(M<I>_{(1-x-y)}M<II>_x M<III>_y)_2O_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0<x\leq1$, $0<y\leq0.1$, $(M<I>_{(1-x-y)}M<II>_x M<III>_y) S_{(1-z)}Se$ where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0<x\leq0.01$, $0<y\leq0.05$, $0\leq z<1$, $(M<I>_{(1-x-y)} M<II>_x M<III>_y)O$ where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0<x\leq0.1$, $0<y\leq0.1$, $(M<I>_{(2-x)}M<II>_x M<III>_2) O_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<x\leq1$, $(M<I>_{(i-x)}M<II>_x M<III>_{(1-y)}M<IV>_y)O_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0<x\leq0.1$, $0<y\leq0.1$, or mixtures thereof.

Other suitable luminescent materials are Ce doped Yttrium aluminum garnet (YAG, $Y_3Al_5O_{12}$) and Lutetium-Aluminum-Garnet (LuAG). A luminescent light guide may comprise a central emission wavelength within a blue color-range or within a green color-range or within a red color-range. The blue color-range is defined between 380 nanometer and 495 nanometer, the green color-range is defined between 495 nanometer and 590 nanometer, and the red color-range is defined between 590 nanometer and 800 nanometer.

A selection of phosphors which may be used in embodiments is given in table 1 below along with the maximum emission wavelength.

TABLE 1

| Phosphor | Maximum emission wavelength [nm] |
| --- | --- |
| $CaGa_2S_4$: Ce | 475 |
| $SrGa_2S_4$: Ce | 450 |
| $BaAl_2S_4$: Eu | 470 |
| $CaF_2$: Eu | 435 |
| $Bi_4Si_3O_{12}$: Ce | 470 |
| $Ca_3Sc_2Si_3O_{12}$: Ce | 490 |

The light guides as set forth below according to embodiments of the invention may comprise regions with a different density of suitable luminescent material for converting the light to another spectral distribution. In an embodiment a transparent light guide comprises two parts adjacent to each other and only one of which comprises a luminescent material and the other part is transparent or has a relatively low concentration of luminescent material. In another embodiment the light guide comprises yet another, third part, adjacent to the second part, which comprises a different luminescent material or a different concentration of the same luminescent material. The different parts may be integrally formed thus forming one piece or one light guide. In an embodiment a partially reflecting element may be arranged between the different parts of the light guide, for example between the first part and the second part. The partially reflecting element is adapted for transmitting light with one specific wavelength or spectral distribution and for reflecting light with another, different, specific wavelength or spectral distribution. The partially reflecting element may thus be a dichroic element such as a dichroic mirror.

In another embodiment (not shown) a plurality of wavelength converting regions of luminescent material is arranged at the light input surface of a transparent light guide above or on top of a plurality of light sources, such as LEDs. Thus the surface area of each of the plurality of wavelength converting regions correspond to the surface area of each of the plurality of light sources such that light from the light sources is coupled into the transparent light guide via the regions of luminescent material. The converted light is then coupled into the transparent part of the light guide and subsequently guided to the light exit surface of the light guide. The wavelength converting regions may be arranged on the light input surface or they may be formed in the light guide. The wavelength converting regions may form part of a homogeneous layer arranged on or in the light guide at the light input surface. Parts of the homogeneous layer extending between two neighboring wavelength converting regions may be transparent and may additionally or alternatively have the same refractive index as the wavelength converting regions. The different wavelength converting regions may comprise mutually different luminescent materials. The distance between the light sources and the luminescent regions may be below 2 mm, below 1 mm or below 0.5 mm.

In embodiments of the light emitting device according to the invention as set forth below a coupling structure or a coupling medium may be provided for efficiently coupling the light emitted by the light source into the light guide. The coupling structure may be a refractive structure having features, such as e.g. protrusions and recesses forming a wave shaped structure. The typical size of the features of the coupling structure is 5 µm to 500 µm. The shape of the features may be e.g. hemispherical (lenses), prismatic, sinusoidal or random (e.g. sand-blasted). By choosing the appropriate shape, the amount of light coupled into the light guide can be tuned. The refractive structures may be made by mechanical means such as by chiseling, sand blasting or the like. Alternatively, the refractive structures may be made by replication in an appropriate material, such as e.g. polymer or sol-gel material. Alternatively, the coupling structure may be a diffractive structure, where the typical size of the features of the diffractive coupling structure is 0.2 µm to 2 µm. The diffraction angles $\theta_{in}$ inside the light guide are given by the grating equation $\lambda/\Lambda = n_{in} \cdot \sin\theta_{in} - n_{out} \cdot \sin\theta_{out}$, where $\lambda$ is the wavelength of LED light, $\Lambda$ is the grating period, $n_{in}$ and $n_{out}$ are the refractive indices inside and outside the light guide, $\theta_{in}$ and $\theta_{out}$ are the diffraction angle inside and the incident angle outside the light guide, respectively. If we assume the same refractive index $n_{out}=1$ for low-index layer and coupling medium, we find, with the condition for total internal reflection $n_{in} \sin \theta_{in} = n_{out}$, the following condition: $\lambda/\Lambda = 1 - \sin \theta_{out}$, i.e. $\Lambda = \lambda$ for normal incidence $\theta_{out} = 0$. Generally, not all other angles $\theta_{out}$ are diffracted into the light guide. This will happen only if its refractive index $n_{in}$ is high enough. From the grating equation it follows that for the condition $n_{in} \geq 2$ all angles are diffracted if $\Lambda = \lambda$. Also other periods and refractive indices may be used, leading to less light that is diffracted into the light guide. Furthermore, in general a lot of light is transmitted ($0^{th}$ order). The amount of diffracted light depends on the shape and height of the grating structures. By choosing the appropriate parameters, the amount of light coupled into the light guide can be tuned. Such diffractive structures most easily are made by replication from structures that have been made by e.g. e-beam lithography or holography. The replication may be done by a method like soft nano-imprint lithography. The coupling medium may e.g. be air or another suitable material.

Turning now to FIG. 1, a 3-dimensional perspective view of a light emitting device 1000 is shown comprising a light guide 4000 adapted for converting incoming light with a first spectral distribution to light with a second, different spectral distribution. The light guide 4000 shown in FIG. 1 comprises or is constructed as a wavelength converter structure 6000 having a first conversion part 6110 in the form of a UV to blue wavelength converter and a second conversion part 6120 in the form of a phosphor adapted to emit white light 1400 based on the blue light input from the first conversion part 6110. Hence, the light emitting device 1000 shown in FIG. 1 comprises a light source in the form of a plurality of LEDs 2100, 2200, 2300 emitting light in the UV to blue wavelength range. The LEDs 2100, 2200, 2300 are arranged on a base or substrate 1500. Particularly, the first conversion part 6110 comprises a polycrystalline cubic Yttrium Aluminum Garnet (YAG), doped with rare earth ions, in an embodiment Europium and/or Terbium, while the second conversion part 6120 comprises a yellow phosphor. This embodiment is advantageous in that the surface area of the light exit surface is smaller than the surface area required to build a light source consisting of direct light emitting LEDs. Thereby, a gain in etendue can be realized.

Alternatives for generating white light with a blue or UV light source include but are not limited to LEDs emitting blue light, which light is converted to green/blue light in the first conversion part 6110, which in turn is converted to white light by the second conversion part being provided as a red phosphor, and LEDs emitting blue light, which light is converted to green light in the first conversion part 6110, which in turn is mixed with red and blue light to generate a white LED source, wherein the mixing is achieved by means of a second conversion part in the form of a red phosphor in front of which a diffusor is arranged.

Figure 2:
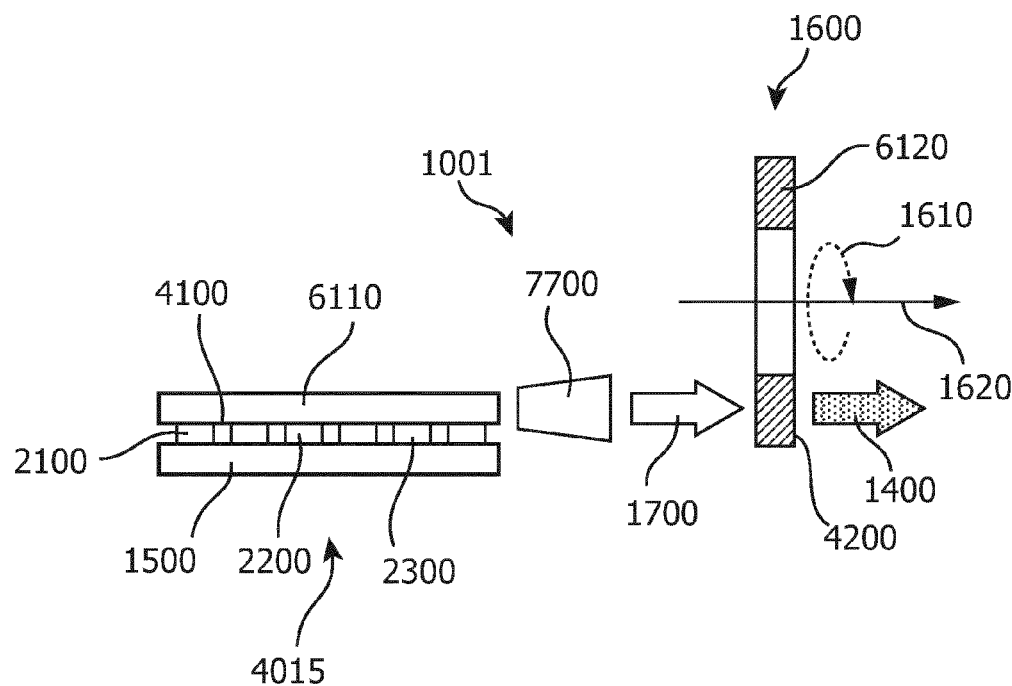
FIG. 2 shows a cross sectional view of a light emitting device comprising a phosphor wheel.

FIG. 2 shows a light emitting device 1001 comprising a light guide 4015 and adapted for converting incoming light with a first spectral distribution to light with a second, different from the first, spectral distribution. The light guide 4015 shown in FIG. 2 comprises or is constructed as a wavelength converter structure having a second conversion part 6120 provided in the form of a rotatable phosphor wheel 1600, and it further comprises a coupling element 7700 arranged between the first conversion part 6110 and the second conversion part 6120 or phosphor wheel 1600.

The light emitting device 1001 further comprises a light source in the form of a plurality of LEDs 2100, 2200, 2300 arranged on a base or substrate 1500. The plurality of LEDs 2100, 2200, 2300 are used to pump the first conversion part 6110, which is in the embodiment shown made of a transparent material, to produce light 1700 having a third spectral distribution, such as green or blue light. The phosphor wheel 1600, which is rotating in a rotation direction 1610 about an axis of rotation 1620, is used for converting the light 1700 having the third spectral distribution to light 1400 having a second spectral distribution, such as red and/or green light. It is noted that in principle any combination of colors of the light 1700 and the light 1400 is feasible.

As shown in FIG. 2, illustrating the phosphor wheel 1600 in a cross sectional side view, the phosphor wheel 1600 is used in the transparent mode, i.e. incident light 1700 enters the phosphor wheel 1600 at one side, is transmitted through the phosphor wheel 1600 and emitted from an opposite side thereof forming the light exit surface 4200. Alternatively, the phosphor wheel 1600 may be used in the reflective mode (not shown) such that light is emitted from the same surface as the surface through which it enters the phosphor wheel.

The phosphor wheel 1600 may comprise only one phosphor throughout. Alternatively, the phosphor wheel 1600 may also comprise segments without any phosphor such that also part of the light 1700 may be transmitted without being converted. In this way sequentially other colors can be generated. In another alternative, the phosphor wheel 1600 may also comprise multiple phosphor segments, e.g. segments of phosphors emitting yellow, green and red light, respectively, such as to create a multi-colored light output. In yet another alternative, the light emitting device 1001 may be adapted for generating white light by employing a pixelated phosphor-reflector pattern on the phosphor wheel 1600.

In an embodiment the coupling element 7700 is an optical element suitable for collimating the light 1700 incident on the phosphor wheel 1600, but it may also be a coupling medium or a coupling structure such as e.g. the coupling medium or the coupling structure 7700 described above. The light emitting device 1001 may furthermore comprise additional lenses and/or collimators. For example, additional optics may be positioned such as to collimate the light emitted by the light sources 2100, 2200, 2300 and/or the light 1400 emitted by the light emitting device 1001.

Figure 3:
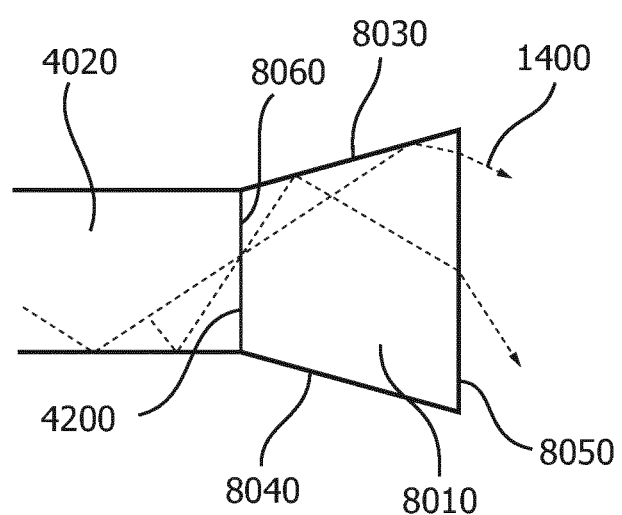
FIG. 3 shows side view of a light guide which is provided with an optical element at an exit surface.

FIG. 3 shows a light guide 4020 which comprises an optical element 8010 arranged with a light input facet 8060 in optical connection with a light exit surface 4200 of the light guide 4020. The optical element 8010 is made of a material having a high refractive index, in an embodiment a refractive index which is equal to or higher than that of the light guide 4020, and comprises a quadrangular cross section and two tapered sides 8030 and 8040. The tapered sides 8030 and 8040 are inclined outwardly from the light exit surface 4200 of the light guide 4020 such that the light exit facet 8050 of the optical element 8010 has a larger surface area than both the light input facet 8060 and the light exit surface 4200 of the light guide 4020. The optical element 8010 may alternatively have more than two, particularly four, tapered sides. In an alternative, the optical element 8010 has a circular cross section and one circumferential tapered side. With such an arrangement light will be reflected at the inclined sides 8030 and 8040 and has a large chance to escape if it hits the light exit facet 8050, as the light exit facet 8050 is large compared to the light input facet 8060. The shape of the sides 8030 and 8040 may also be curved and chosen such that all light escapes through the light exit facet 8050.

The optical element may also be integrally formed from the light guide 4020, for example by shaping a part of the light guide such that a predetermined optical element is formed at one of the ends of the light guide. The optical element may for example have the shape of a collimator, or may have a cross-sectional shape of a trapezoid and in an embodiment outside surfaces of the trapezoid shape are provided with reflective layers. Thereby the received light may be shaped such as to comprise a larger spot size while simultaneously minimizing the loss of light through other surfaces than the light exit surface, thus also improving the intensity of the emitted light. In another embodiment the optical element has the shape of a lens array, for example convex or concave lenses or combinations thereof. Thereby the received light may be shaped such as to form focused light, defocused light or a combination thereof. In case of an array of lenses it is furthermore feasible that the emitted light may comprise two or more separate beams each formed by one or more lenses of the array. In more general terms, the light guide may thus have differently shaped parts with different sizes. Thereby a light guide is provided with which light may be shaped in that any one or more of the direction of emission of light from the light exit surface, the beam size and beam shape of the light emitted from the light exit surface may be tuned in a particularly simple manner, e.g. by altering the size and/or shape of the light exit surface. Thus, a part of the light guide functions as an optical element.

The optical element may also be a light concentrating element (not shown) arranged at the light exit surface of the light guide. The light concentrating element comprises a quadrangular cross section and two outwardly curved sides such that the light exit surface of the light concentrating element has a larger surface area than the light exit surface of the light guide. The light concentrating element may alternatively have more than two, particularly four, tapered sides. The light concentrating element may be a compound parabolic light concentrating element (CPC) having parabolic curved sides. In an alternative, the light concentrating element has a circular cross section and one circumferential tapered side. If, in an alternative, the refractive index of the light concentrating element is chosen to be lower than that of the light guide (but higher than that of air), still an appreciable amount of light can be extracted. This allows for a light concentrating element which is easy and cheap to manufacture compared to one made of a material with a high refractive index. For example, if the light guide has a refractive index of n=1.8 and the light concentrating element has a refractive index of n=1.5 (glass), a gain of a factor of 2 in light output may be achieved. For a light concentrating element with a refractive index of n=1.8, the gain would be about 10% more. Actually, not all light will be extracted since there will be Fresnel reflections at the interface between the optical element or the light concentrating element and the external medium, generally being air. These Fresnel reflections may be reduced by using an appropriate anti-reflection coating, i.e. a quarter-lambda dielectric stack or moth-eye structure. In case the light output as function of position over the light exit facet is inhomogeneous, the coverage with anti-reflection coating might be varied, e.g. by varying the thickness of the coating.

One of the interesting features of a CPC is that the etendue (=$n^2 \times area \times solid\ angle$, where n is the refractive index) of the light is conserved. The shape and size of the light input facet of the CPC can be adapted to those of the light exit surface of the light guide and/or vice versa. A large advantage of a CPC is that the incoming light distribution is transformed into a light distribution that fits optimally to the acceptable etendue of a given application. The shape of the light exit facet of the CPC may be e.g. rectangular or circular, depending on the desires. For example, for a digital projector there will be requirements to the size (height and width) of the beam, as well as for the divergence. The corresponding etendue will be conserved in a CPC. In this case it will be beneficial to use a CPC with rectangular light input and exit facets having the desired height/width ratio of the display panel used. For a spot light application, the requirements are less severe. The light exit facet of the CPC may be circular, but may also have another shape (e.g. rectangular) to illuminate a particularly shaped area or a desired pattern to project such pattern on screens, walls, buildings, infrastructures etc. Although CPCs offer a lot of flexibility in design, their length can be rather large. In general, it is possible to design shorter optical elements with the same performance. To this end, the surface shape and/or the exit surface may be adapted, e.g. to have a more curved exit surface such as to concentrate the light. One additional advantage is that the CPC can be used to overcome possible aspect ratio mismatches when the size of the light guide is restrained by the dimensions of the LED and the size of the light exit facet is determined by the subsequent optical components. Furthermore, it is possible to place a mirror (not shown) partially covering the light exit facet of the CPC, e.g. using a mirror which has a 'hole' near or in its center. In this way the exit plane of the CPC is narrowed down, part of the light is being reflected back into the CPC and the light guide, and thus the exit etendue of the light would be reduced. This would, naturally, decrease the amount of light that is extracted from the CPC and light guide. However, if this mirror has a high reflectivity, like e.g. Alanod 4200AG, the light can be effectively injected back into the CPC and light guide, where it may be recycled by TIR. This will not change the angular distribution of the light, but it will alter the position at which the light will hit the CPC exit plane after recycling thus increasing the luminous flux. In this way, part of the light, that normally would be sacrificed in order to reduce the system etendue, can be re-gained and used to increase for example the homogeneity. This is of major importance if the system is used in a digital projection application. By choosing the mirror in the different ways, the same set of CPC and light guide can be used to address systems using different panel sizes and aspect ratio's, without having to sacrifice a large amount of light. In this way, one single system can be used for various digital projection applications.

By using any one of the above structures described with reference to FIG. 3, problems in connection with extracting light from the high-index light guide material to a low-index material like air, particularly related to the efficiency of the extraction, are solved.

Figure 4:
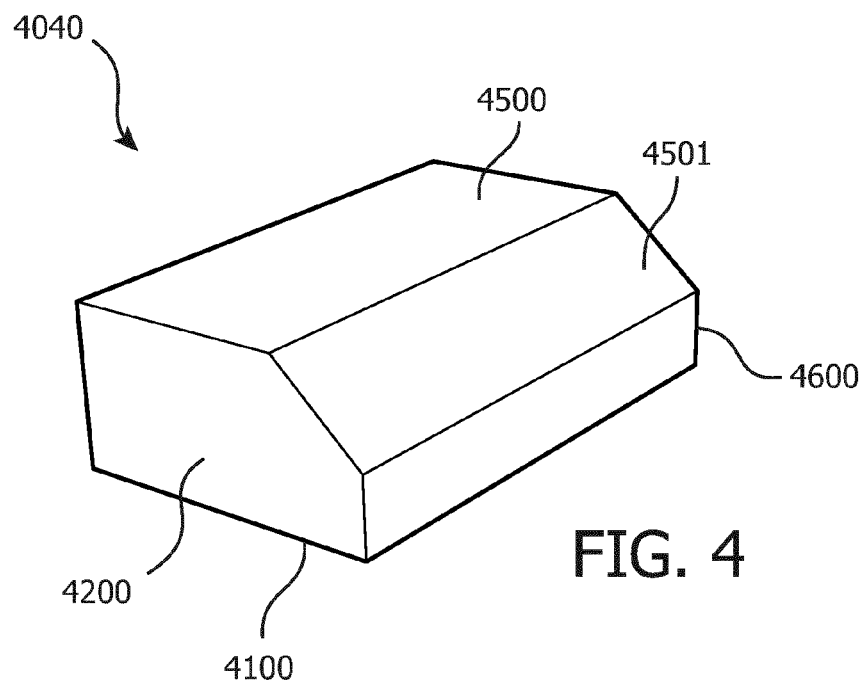
FIG. 4 shows a perspective view of a light guide which is shaped throughout its length such as to provide a shaped light exit surface.
Figure 5:
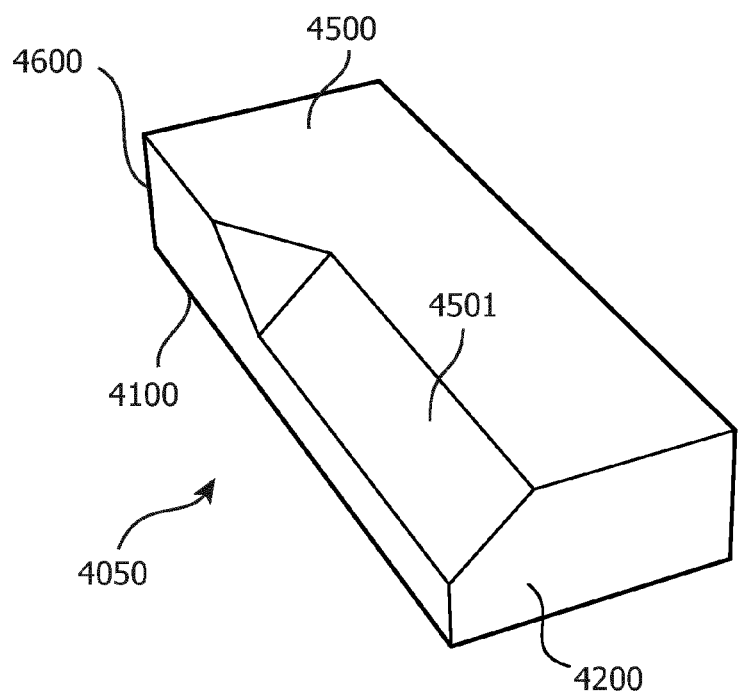
FIG. 5 shows a side view of a light guide which is shaped over a part of its length such as to provide a shaped light exit surface.

With reference to FIGS. 4 and 5 different possibilities for providing a light distribution having a particular shape will be described. FIG. 4 shows a perspective view of a light guide 4040 which is shaped throughout its length in order to provide a shaped light exit surface 4200. The light guide 4040 may be a transparent light guide or a light guide adapted for converting light with a first spectral distribution to light with a second spectral distribution. A part 4501 of the light guide 4040 extending throughout the length of the light guide 4040, particularly adjacent to the surface 4500 and opposite to the light input surface 4100, has been removed such as to provide the light guide 4040 with a shape corresponding to the desired shape of the light distribution at the light exit surface 4200, the shape extending throughout the entire length of the light guide 4040 from the light exit surface 4200 to the opposite surface 4600.

FIG. 5 shows a side view of a light guide 4050 which is shaped over a part of its length such as to provide a shaped light exit surface 4200. The light guide 4050 may be a transparent light guide or a light guide adapted for converting light with a first spectral distribution to light with a second spectral distribution. A part 4501 of the light guide 4050 extending over a part of the length of the light guide 4050 has been removed, particularly adjacent to the surface 4500 and opposite to the light input surface 4100, such as to provide the light guide 4050 with a shape corresponding to the desired shape of the light distribution at the light exit surface 4200, the shape extending over a part of the length of the light guide 4050 adjacent the light exit surface 4200.

Another part or more than one part of the light guide may be removed such as to provide for other shapes of the light exit surface. Any feasible shape of the light exit surface may be obtained in this way. Also, the light guide may be divided partly or fully into several parts having different shapes, such that more complex shapes may be obtained. The part or parts removed from the light guide may be removed by means of e.g. sawing, cutting or the like followed by polishing of the surface that is exposed after the removal of the part or parts. In another alternative a central part of the light guide may be removed, e.g. by drilling, such as to provide a hole in the light exit surface.

In an alternative embodiment, a light distribution having a particular shape may also be obtained by surface treating, e.g. roughening, a part of the light exit surface of the light guide, whilst leaving the remaining part of the light exit surface smooth. In this embodiment no parts of the light guide need to be removed. Likewise any combination of the above possibilities for obtaining a light distribution having a particular shape is feasible.

Figure 6:
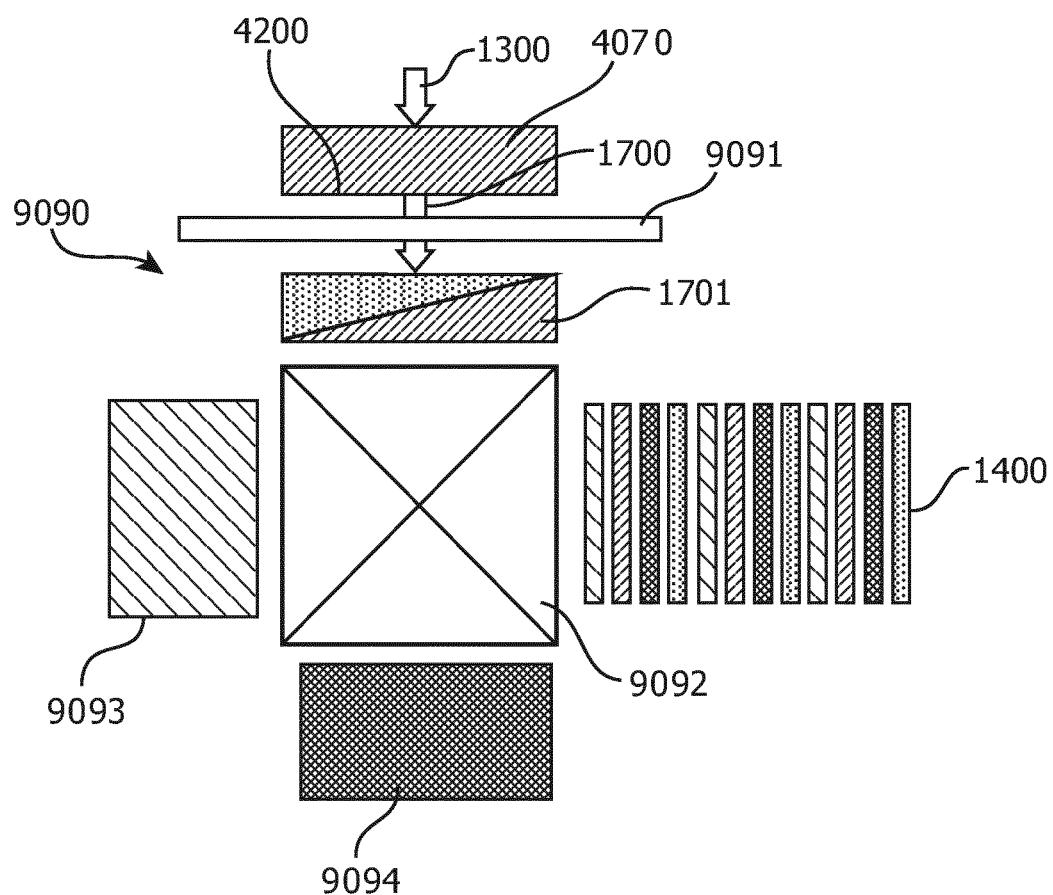
FIG. 6 shows a side view of a lighting system with a light guide and additional light sources and which is provided with a filter and a dichroic optical element.

FIG. 6 shows a side view of a lighting system, e.g. a digital projector, with a light guide 4070 which is adapted for converting incident light 1300 in such a way that the emitted light 1700 is in the yellow and/or orange wavelength range, i.e. roughly in the wavelength range of 560 nm to 600 nm. The light guide 4070 may e.g. be provided as a transparent garnet made of ceramic materials such as Ce-doped $(Lu,Gd)_3Al_5O_{12}$, $(Y,Gd)_3Al_5O_{12}$ or $(Y,Tb)_3Al_5O_{12}$. With higher Ce-content and/or higher substitution levels of e.g. Gd and/or Tb in favor of Ce, the spectral distribution of the light emitted by the light guide can be shifted to higher wavelengths. In an embodiment, the light guide 4070 is fully transparent.

At the light exit surface 4200 an optical element 9090 is provided. The optical element 9090 comprises a filter 9091 for filtering the light 1700 emitted from the light guide 4070 such as to provide filtered light 1701, at least one further light source 9093, 9094 and an optical component 9092 adapted for combining the filtered light 1701 and the light from the at least one further light source 9093, 9094 such as to provide a common light output 1400. The filter 9091 may be an absorption filter or a reflective filter, which may be fixed or switchable. A switchable filter may e.g. be obtained by providing a reflective dichroic mirror, which may be low-pass, band-pass or high-pass according to the desired light output, and a switchable mirror and placing the switchable mirror upstream of the dichroic mirror seen in the light propagation direction. Furthermore, it is also feasible to combine two or more filters and/or mirrors to select a desired light output. The filter 9091 shown in FIG. 6 is a switchable filter enabling the transmission of unfiltered yellow and/or orange light or filtered light, particularly and in the embodiment shown filtered red light, according to the switching state of the filter 9091. The spectral distribution of the filtered light depends on the characteristics of the filter 9091 employed. The optical component 9092 as shown may be a cross dichroic prism also known as an X-cube or it may in an alternative be a suitable set of individual dichroic filters.

In the embodiment shown two further light sources 9093 and 9094 are provided, the further light source 9093 being a blue light source and the further light source 9094 being a green light source. Other colors and/or a higher number of further light sources may be feasible too. One or more of the further light sources may also be light guides according to embodiments of the invention as set forth below. A further option is to use the light filtered out by the filter 9091 as a further light source. The common light output 1400 is thus a combination of light 1701 emitted by the light guide 4070 and filtered by the filter 9091 and light emitted by the respective two further light sources 9093 and 9094. The common light output 1400 may advantageously be white light.

The solution shown in FIG. 6 is advantageous in that it is scalable, cost effective and easily adaptable according to the requirements for a given application of a light emitting device according to embodiments of the invention.

Figure 7:
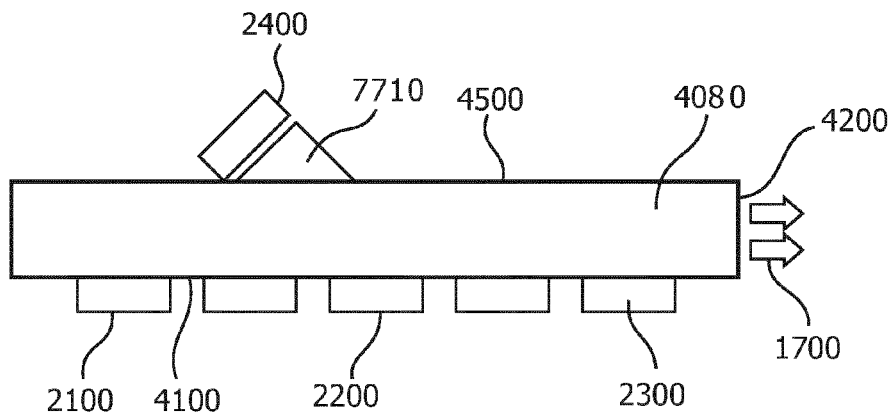
FIG. 7 shows a light guide provided with a second light source arranged at a surface of the light guide different from a first light input surface.

FIG. 7 shows a side view of a light guide 4080 which comprises first light sources 2100, 2200, 2300 emitting light with a first spectral distribution and being arranged adjacent the light input surface 4100 of the light guide 4080. The light guide 4080 furthermore comprises at least one second light source 2400 emitting light with a second spectral distribution, which is different from the first spectral distribution, and which is arranged adjacent to a surface 4500 of the light guide 4080 extending parallel and opposite to the light input surface 4100. The light guide 4080 is adapted for converting at least a part of the light with the first spectral distribution to light with a third spectral distribution different from the first spectral distribution and for guiding the light with the second spectral distribution without converting it. In this way the light 1700 emitted by the light guide 4080 through the light exit surface 4200 comprises a combination of at least the light with the second and third spectral distribution, respectively, and possibly also of the light with the first spectral distribution, as part of this light may remain unconverted. By way of a non-limiting example, the first spectral distribution may be in the wavelength range below 400 nm, the second spectral distribution may be in the red wavelength range, i.e. 500 to 800 nm and the third spectral distribution may be in the wavelength range 400 to 500 nm. By way of another non-limiting example, the first spectral distribution may be in the green wavelength range, i.e. 400 to 500 nm, the second spectral distribution may be in the red wavelength range, i.e. 500 to 800 nm and the third spectral distribution may be in the wavelength range 440 to 600 nm. By way of yet another non-limiting example the first light sources 2100, 2200, 2300 may be emitting in the wavelength range 440 to 480 nm, the light guide 4080 may convert the light emitted by the first light sources to light with a wavelength in the range 480 to 600 nm and the second light source 2400 may be emitting in the wavelength range 600 to 800 nm. It is noted that in principle all feasible combinations of first, second and third spectral distributions may be used. Thereby a simple and efficient way of producing white light is obtained.

As shown in FIG. 7 the light guide 4080 further comprises a coupling element 7710 adapted for coupling light from the second light source 2400 into the light guide 4080. The coupling element 7710 may be a coupling structure or coupling medium as described above. It is noted that the coupling element is an optional element, and may thus also be omitted, in which case the second light source may be arranged in direct optical contact with the light guide.

More than one second light source may be provided. In these embodiments it is furthermore feasible to provide second light sources emitting light with different spectral distributions such that second light sources arranged at different surfaces emit light having different spectral distributions. Furthermore, second light sources may alternatively or additionally be arranged at more than one of the surfaces of the light guide 4080 different from the light input surface 4100, e.g. at two different surfaces. For example the at least one second light source 2400 may be arranged at a surface opposite to the light exit surface 4200 of the light guide 4080.

Figure 8A:
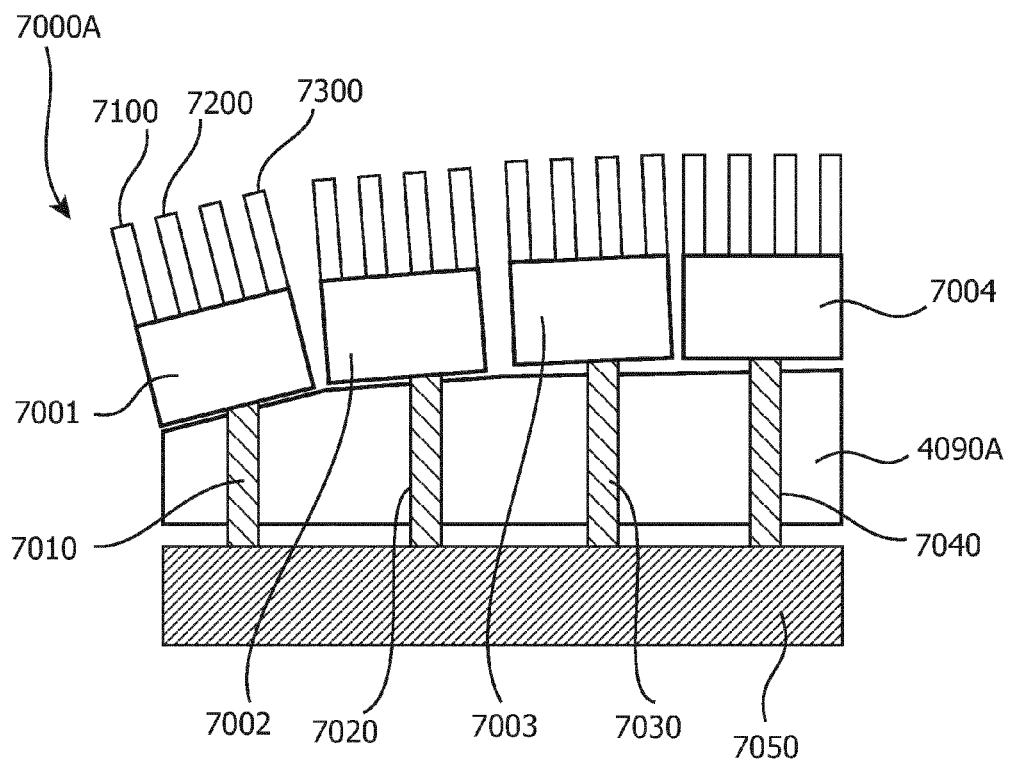
FIGS. 8A and 8B show light guides provided with a heat sink element arranged adjacent a surface of the light guide.
Figure 8B:
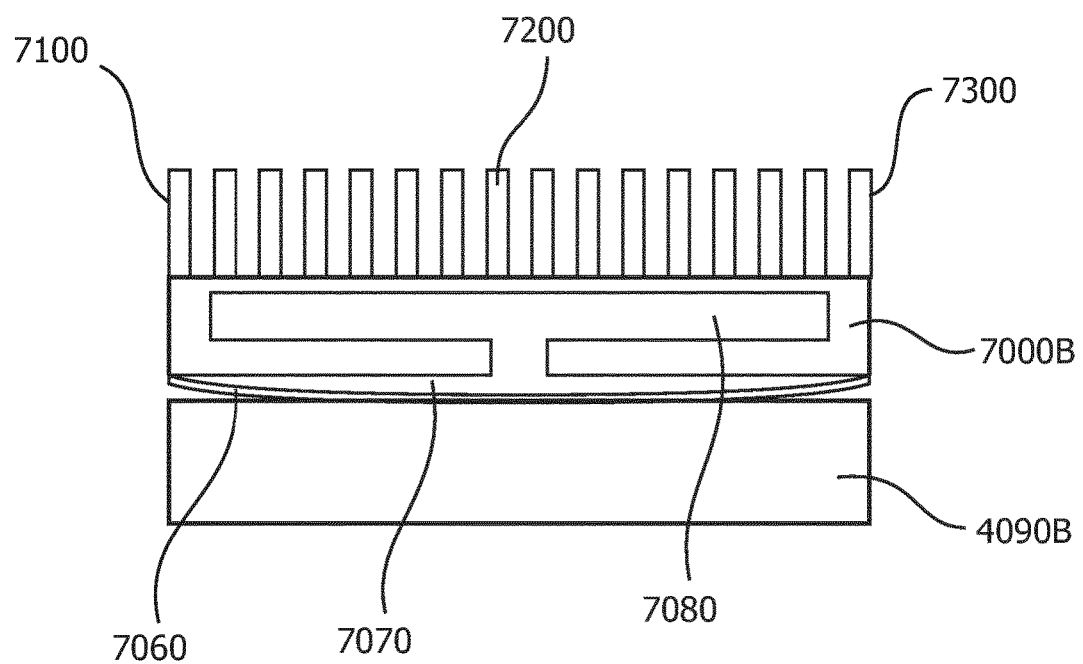

FIGS. 8A and 8B show a side view of a light guide 4090A and a light guide 4090B, respectively, that comprise a heat sink element 7000A, 7000B, respectively, arranged on one of the surfaces of the light guide 4090A, 4090B, respectively, different from the light input surface, preferably at a distance of about 30 µm or less therefrom. Irrespective of the embodiment the respective heat sink element 7000A, 7000B comprises fins 7100, 7200, 7300 for improved heat dissipation, the fins, however, being optional elements. Irrespective of the embodiment the respective heat sink element 7000A, 7000B is adapted to be conformable to the surface shape of the light guide, and is thus adapted for providing a conformal thermal contact over the whole contact area with the light guide. Thereby an increased thermal contact area and thus an improved cooling of the light guide is obtained and the existing tolerance limits on the positioning of the heat sink element become less critical.

FIG. 8A shows that heat sink element 7000A comprises a plurality of heat sink parts, here four heat sink parts 7001, 7002, 7003 and 7004, one or more of which, here all four, may be provided with fins. Obviously, the more heat sink parts the heat sink element 7000A comprises, the more precisely the heat sink element 7000 may be conformed to the surface of the light guide. Each heat sink part 7001, 7002, 7003, 7004 is adapted for providing a conformal thermal contact over the whole contact area with the light guide. The heat sink parts may be arranged in mutually different distances from the surface of the light guide. Furthermore, the heat sink element 7000A comprises a common carrier 7050 to which the heat sink parts 7001, 7002, 7003 and 7004 are attached individually by means of attachment elements 7010, 7020, 7030 and 7040, respectively. Alternatively each heat sink part may be assigned its own carrier. It is noted that these elements are optional.

FIG. 8B shows that heat sink element 7000B comprises a bottom part 7060 adapted to be conformable to the shape of the surface of the light guide 4090B at which it is to be arranged. The bottom part 7060 is flexible and may e.g. be a thermally conductive metal layer such as a copper layer. The heat sink element 7000B further comprises a thermally conductive layer 7070 arranged between the bottom element 7060 and the remainder of the heat sink element 7000B for improved flexibility and conformability of the heat sink element 7000B. The thermally conductive layer 7070 may e.g. be a thermally conductive fluid or paste. The thermally conductive layer 7070 is in an embodiment highly reflective and/or comprises a highly reflective coating. The heat sink element 7000B further comprises a fluid reservoir 7080 arranged inside the heat sink element 7000B for generating a fluid flow for improved heat dissipation. In an alternative, the fluid reservoir 7080 may also be arranged externally on the heat sink element 7000B, e.g. extending along a part of or the whole external periphery of the heat sink element 7000B. The fluid flow may be enhanced by means of a pump. It is noted that the conductive layer 7070 and the fluid reservoir 7080 are optional elements.

Irrespective of the embodiment, the heat sink element 7000A, 7000B may be made of a material selected from copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Furthermore, a heat sink element combining features of the embodiments described above is feasible. Also, it is feasible to arrange a heat sink element according to any of the above embodiments at more than one surface of the light guide 4090A or 4090B.

Finally it is noted that the provision of a heat sink element as described above is especially advantageous in a light emitting device employing a light source emitting in the red wavelength range and/or being adapted for emitting light in the infrared wavelength range, e.g. by comprising an IR emitting phosphor.

FIGS. 9A to 9D show side views of a light guide 4010A, 4010B, 4010C and 4010D, respectively, comprising a light polarizing element 9001 arranged adjacent to the light exit surface 4200 of the respective light guide 4010A, 4010B, 4010C, 4010D as well as a reflective element 7400 arranged at a surface 4600 of the respective light guide 4010A, 4010B, 4010C, 4010D extending opposite to the light exit surface 4200. Thereby a polarized light source having a high brightness and a high efficiency may be obtained. Irrespective of the embodiment the polarizing element 9001 may be any one of a reflective linear polarizer and a reflective circular polarizer. Wire grid polarizers, reflective polarizers based on stack of polymer layers comprising birefringent layers are examples of reflective linear polarizers. Circular polarizers can be obtained using polymers in the so-called cholesteric liquid crystal phase to make so-called cholesteric polarizers transmitting only light of one polarization and of a specific spectral distribution. Alternatively or in addition to the reflective polarizers, polarizing beam splitters can also be employed. Furthermore scattering polarizers can also be used. In another embodiment, polarization by reflection may be used, e.g. by means of a polarizing element in the form of a wedge made of a material like glass, in which light is incident close to the Brewster angle. In yet another embodiment, the polarizing element 9001 may be a so-called polarized backlight such as described in WO 2007/036877 A2. In yet another embodiment, the polarizing element 9001 may be a polarizing structure.

Figure 9A:
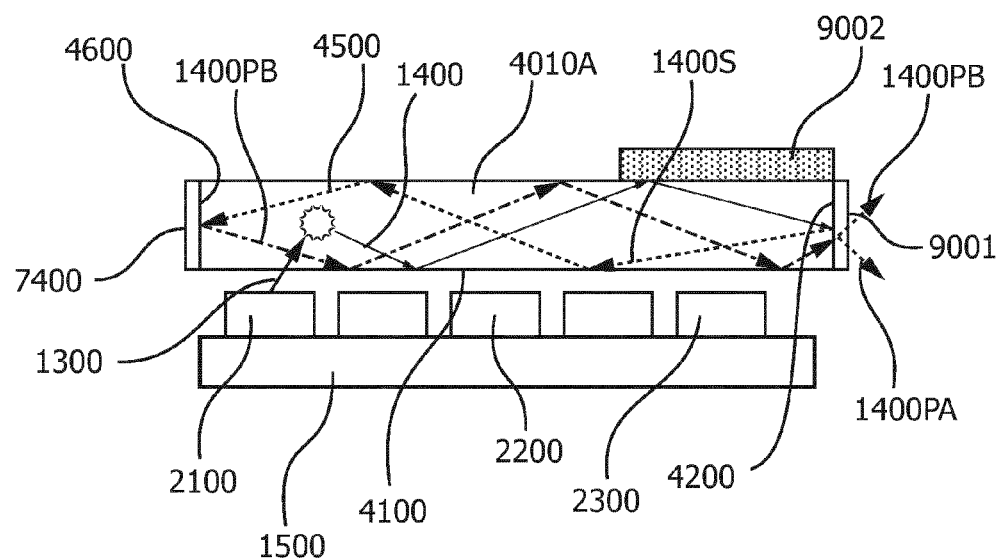
FIG. 9A to 9D show light guides provided with a polarizing element arranged adjacent to the light exit surface of the light guide.

FIG. 9A shows an embodiment in which the polarizing element 9001 is arranged on the light exit surface 4200 of the light guide 4010A. The light sources 2100, 2200, 2300 emit first light 1300 having a first spectral distribution, which is converted in the light guide 4010A into second light 1400 having a second spectral distribution. Due to the polarizing element 9001 only light of a first polarization, in this case p-polarized light 1400PA, is transmitted and emitted from the light exit surface 4200 and light of a second polarization, in this case s-polarized light 1400S, is reflected back into the light guide 4010A. The reflected s-polarized light 1400S is reflected by the reflective element 7400. When reflected, at least a part of the reflected s-polarized light 1400S is altered into p-polarized light 1400PB which is transmitted by the polarizing element 9001. Thus, a light output comprising only light with a first polarization, in this case p-polarized light 1400PA, 1400PB is obtained.

Furthermore, in this example the light guide 4010A comprises a ¼ lambda plate 9002 arranged at one of the surfaces extending between the light exit surface 4200 and the opposite surface 4600, in the embodiment shown partially covering the surface 4500. Alternatively, the ¼ lambda plate may cover the surface 4500 completely or it may comprise two or more separate segments. Alternatively or in addition thereto, further ¼ lambda plates may be arranged at one or more other of the surfaces extending between the light exit surface 4200 and the surface 4600. In yet another embodiment the ¼ lambda plate 9002 may be arranged between the light guide and the reflective element 7400 such that a gap is provided between the ¼ lambda plate and the light guide. The ¼ lambda plate 9002 may be used for converting light with a first polarization into light with a second polarization, particularly for converting circularly polarized light into linearly polarized light. It is noted, however, that irrespective of the embodiment the ¼ lambda plate 9002 is an optional element, and that it thus may also be omitted.

Figure 9B:
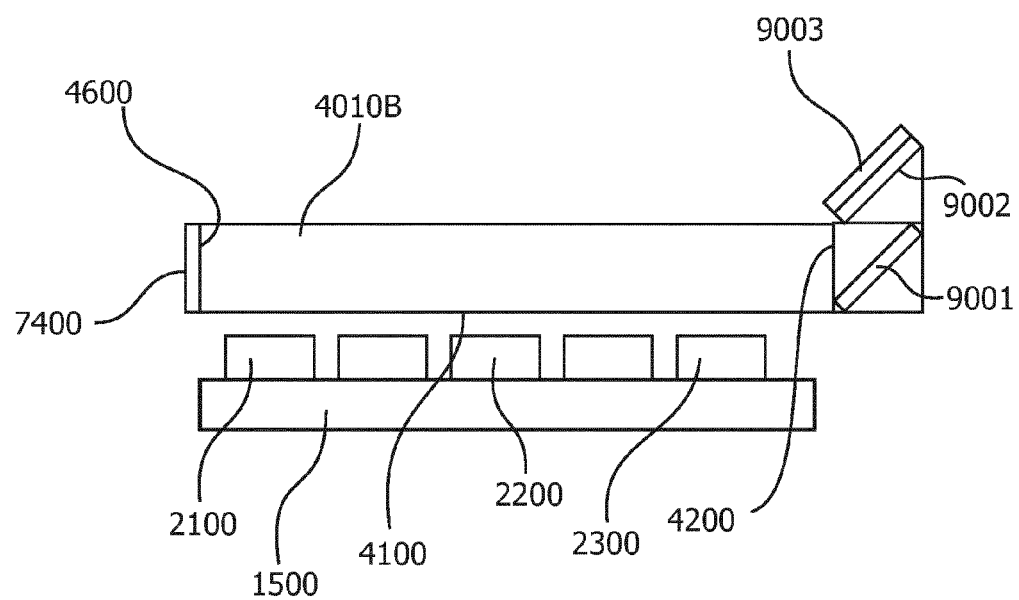

FIG. 9B shows an embodiment in which the polarizing element 9001 is arranged angled with respect to the light exit surface 4200, as shown in an angle of 45° relative to the light exit surface 4200 although any angle is in principle feasible. Furthermore, a ¼ lambda plate 9002 and a reflective element 9003 stacked on top of each other are arranged in the beam path downstream of the polarizing element 9001 such that they extend substantially in parallel with the polarizing element 9001. Thereby, reflected light with a first polarization is coupled out of the light guide 4010B and is thereupon altered into light with a second polarization by the polarizing element 9001, Subsequently the light with the second polarization is redirected by the reflective element 9003 and further polarized by the ¼ lambda plate 9002.

Figure 9C:
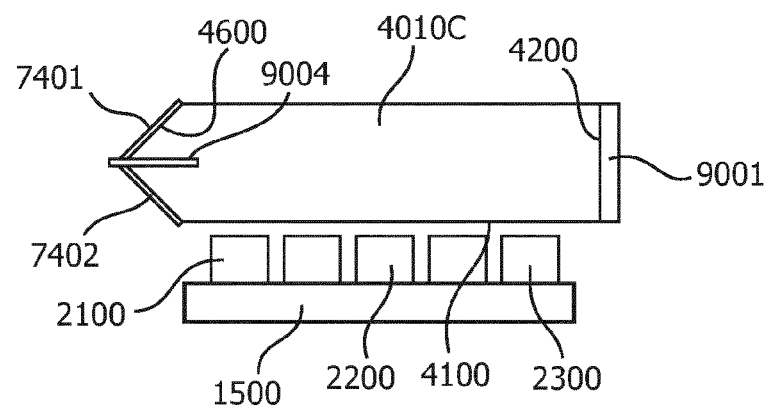

FIG. 9C shows an embodiment very similar to that shown in FIG. 9A but according to which the light guide 4010C as an alternative comprises a tapered surface 4600 opposite to the light exit surface 4200. The tapered surface 4600 is provided with reflective elements 4701, 4702 separated by an insert in the form of a ½ lambda plate 9004.

Figure 9D:
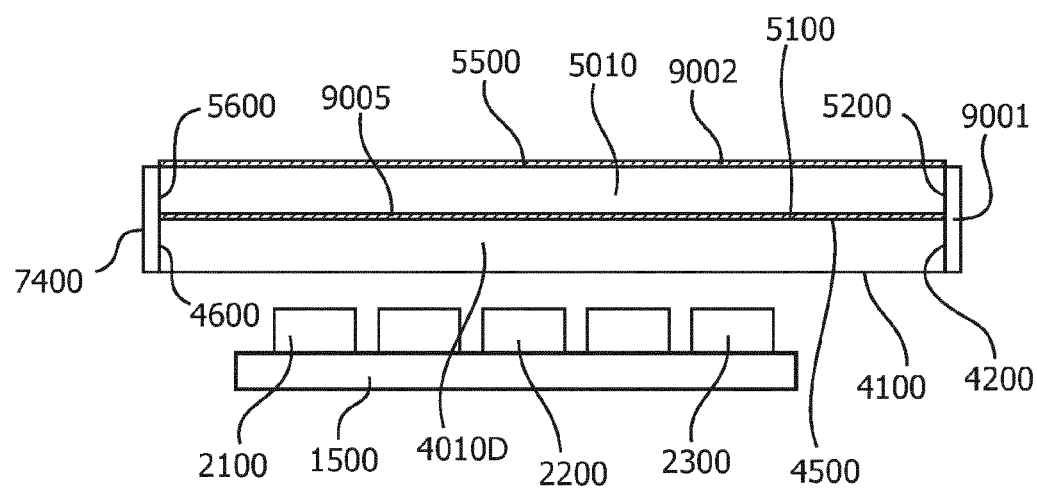

FIG. 9D shows an embodiment in which two light guides 4010D and 5010 are stacked such that the surface 4500 of the light guide 4010D and the light input surface 5100 of the light guide 5010 face each other and with a further polarizing element 9005 arranged in between and in optical contact with the light guides 4010D and 5010. A polarizing element 9001 is arranged on the light exit surfaces 4200 and 5200 of the light guides 4010D and 5010 and a reflective element 7400 is arranged on the surfaces 4600 and 5600 of the light guides 4010D and 5010 opposite the respective light exit surfaces 4200, 5200. The further polarizing element 9005 transmits light with a polarization being perpendicular to the polarization of the light transmitted by the polarizing element 9001. A ¼ lambda plate 9002 may be applied to at least a part of the surface 5500 of the light guide 5010.

In further alternative embodiments the polarizing element 9001 may be provided as a part of an optical element arranged at the light exit surface 4200 of the light guide. In one particular embodiment the polarizing element 9001 is then arranged such as to be located opposite to the light exit surface 4200 in the mounted position of the optical element. By way of example such an optical element may for instance be an optical element, a compound parabolic light concentrating element (CPC) or an optical element as described above. Alternatively, such an optical element may be a light mixing chamber. Particularly in case of a CPC a ¼ lambda plate may be arranged in the CPC opposite to the polarizing element 9001.

Figure 10:
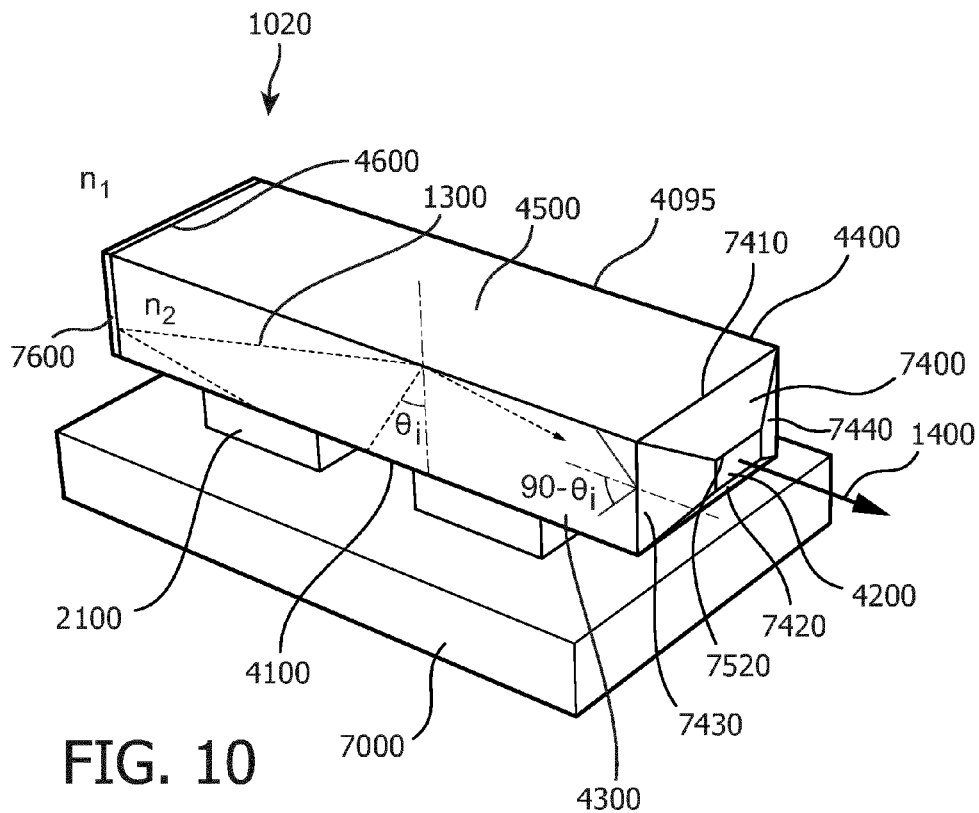
FIG. 10 shows a perspective view of a light emitting device having a tapered exit surface.

FIG. 10 shows a light emitting device 1020 comprising a light source 2100 comprising a plurality of LEDs and a light guide 4095. The light source 2100 is in this example arranged on a base or substrate in the form of a heat sink 7000, preferably made of a metal such as copper, iron or aluminum. It is noted that in other embodiments the base or substrate need not be a heat sink. The light guide 4095 is shown shaped generally as a bar or rod having a light input surface 4100 and a light exit surface 4200 extending in an angle different from zero, in this particular case perpendicular, with respect to one another such that the light exit surface 4200 is an end surface of the light guide 4095. The light input surface 4100 and the light exit surface 4200 may have different sizes, preferably such that the light input surface 4100 is larger than the light exit surface 4200. The light guide 4095 further comprises a further surface 4600 extending parallel to and opposite the light exit surface 4200, the further surface 4600 thus likewise being an end surface of the light guide 4095. The light guide 4095 further comprises side surfaces 4300, 4400, 4500. The light guide 4095 may also be plate shaped, e.g. as a square or rectangular plate.

The light emitting device 1020 further comprises a first mirror element 7600 arranged at the further surface 4600 of the light guide 4095 as well as a second mirror element 7400 arranged at the light exit surface 4200 of the light guide 4095. As shown the first mirror element 7600 is arranged in optical contact with the light exit surface 4200 and the second mirror element 7600 is arranged in optical contact with the further surface 4600. Alternatively, a gap may be provided between one or both of the first and the second mirror element 7600 and 7400 and the further surface 4600 and the light exit surface 4200, respectively. Such a gap may be filled with e.g. air or an optical adhesive.

The light exit surface 4200 of the light guide 4095 is further provided with four inwardly tapered walls and a central flat part extending parallel with the further surface 4600. By "tapered wall" as used herein is meant a wall segment of the light exit surface 4200 which is arranged in an angle different from zero degrees to both the remaining part(s) of the light exit surface and to the surfaces of the light guide extending adjacent to the light exit surface. The walls are tapered inwardly, meaning that the cross-section of the light guide is gradually decreasing towards the exit surface. In this embodiment a second mirror element 7400 is arranged at, and is in optical contact with, the tapered walls of the light exit surface 4200. Hence, the second mirror element is provided with four segments 7410, 7420, 7430 and 7410 corresponding to and covering each of the tapered walls of the light exit surface 4200. A through opening 7520 corresponding to the central flat part of the light exit surface 4200 defines a transparent part of the light exit surface 4200 through which light may exit to be emitted from the light emitting device 1020.

In this way a light emitting device is provided in which the light rays that hit the second mirror element change angular direction such that more light rays are directed towards the light exit surface 4200 and light rays that previously would remain within the light guide 4095 due to TIR due to the change in angular directions now hit the light exit surface 4200 with angles smaller than the critical angle of reflection and consequently may leave the light guide through the through opening 7520 of the light exit surface 4200. Thereby the intensity of the light emitted by the light emitting device through the light exit surface 4200 of the light guide 4095 is increased further. Particularly, when the light guide is a rectangular bar, there will be light rays that hit the second mirror element at the exit surface perpendicularly, and as such cannot leave the bar since they remain bouncing between the two mirror elements. When one mirror element is tilted inwards, the light rays change direction after being reflected at that mirror element and may leave the light guide via the transparent part of the second mirror element. Thus, this configuration provides for improved guidance of light towards the central flat part of the light exit surface 4200 and thus the through hole 7520 in the second mirror element 7400 by means of reflection off of the tapered walls.

In alternative embodiments other numbers of tapered walls, such as less or more than four, e.g. one, two, three, five or six tapered walls, may be provided, and similarly not all tapered walls need be provided with a second mirror element or segments thereof. In other alternatives, one or more of the tapered walls may be uncovered by the second mirror element 7400, and/or the central flat part may be covered partly or fully by the second mirror element 7400.

Figure 11:
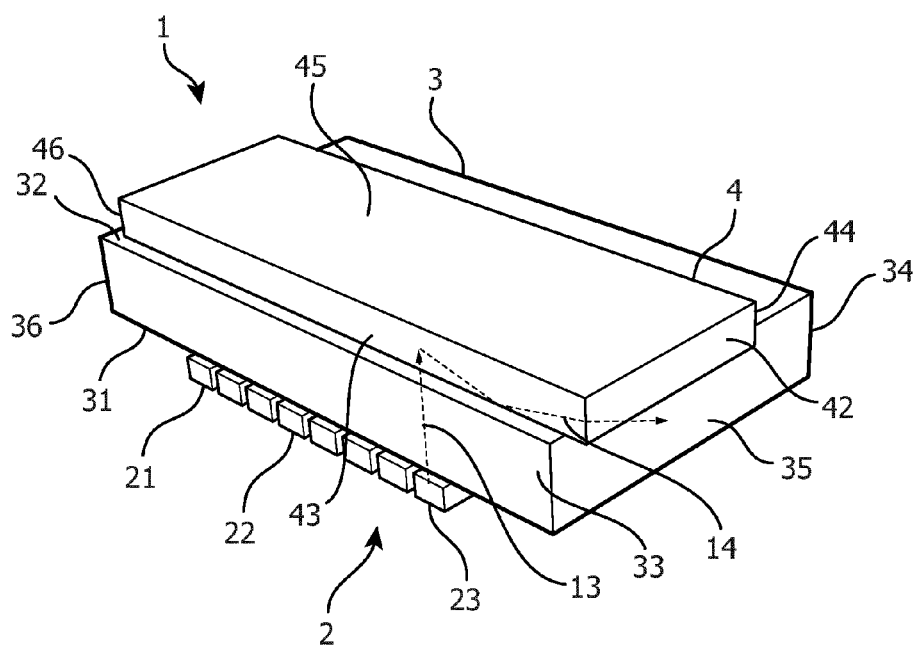
FIG. 11 shows a perspective view of a light emitting device according to a first and general embodiment of the invention.

FIG. 11 shows a perspective view of a light emitting device 1 according to a first and general embodiment of the invention. The light emitting device 1 generally comprises a light source 2 comprising a plurality of LEDs 21, 22, 23, a transparent heat sink element 3 and a first luminescent light guide 4.

The transparent heat sink element 3 is shown shaped generally as a bar or rod having a first light input surface 31 and a first light exit surface 32 arranged opposite to one another as well as further side surfaces 33, 34, 35, 36 arranged pairwise opposite one another and extending between the first light input surface 31 and the first light exit surface 32. The transparent heat sink element 3 may also be plate shaped, e.g. as a square or rectangular plate, or in principle have any other suitable shape.

The transparent heat sink element 3 generally lets the light pass through with very small or no loss of light, while heat is spread and distributed in directions away from the first luminescent light guide 4. That is, in the embodiment shown heat is emitted through one or more of the further side surfaces 33, 34, 35, 36.

Suitable materials for such a transparent heat sink element 3 are materials which are highly transparent, i.e. materials though which all or substantially all incident light is transmitted, e.g. materials having a transparency of more than 90%, and which have a high heat conductivity, i.e. a heat conductivity which is larger than e.g. 1 W/(m*K), and preferably more than 10 W/(m*K).

Suitable materials include, but are not limited to sapphire, undoped transparent garnets such as YAG, LuAG, glass, quartz and other ceramic materials such as aluminaoxide.

The first luminescent light guide 4 is shown shaped generally as a bar or rod having a first light input surface 41, a first light exit surface 42 being an end surface of the first luminescent light guide 4 as well as further side surfaces 43, 44, 45, 46. The first luminescent light guide 4 may also be plate shaped, e.g. as a square or rectangular plate.

The first light input surface 41 and the first light exit surface 42 generally extend in an angle different from zero with respect to each other, i.e. they are not in parallel planes. In the embodiments shown herein the first light input surface 41 and the first light exit surface 42 extend perpendicular to each other. Also, the first light input surface 41 and the first light exit surface 42 have different sizes, preferably such that the first light input surface 41 is larger than the first light exit surface 42.

The first luminescent light guide 4 is made of a luminescent material, such as a luminescent garnet, suitable garnets being described above. Furthermore, the luminescent material of the first luminescent light guide 4 is preferably transparent, light concentrating or a combination thereof, suitable materials being described above.

The transparent heat sink element 3 and the light guide 4 may be arranged in physical, thermal and optical contact with each other.

The light emitting device 1 generally works as follows. Light 13 having a first spectral distribution is emitted by the light source 2 and transmitted through the transparent heat sink element 3 entering at the light input surface 31 and exiting at the light exit surface 32. Thus, as shown the transparent heat sink element 3 is arranged in the optical path between the light source 2 and the first luminescent light guide 4. In principle, however, not all light need be transmitted through the light exit surface 32 as some of the light may be transmitted e.g. through the surface 35.

The light 13 having the first spectral distribution then enters the first luminescent light guide 4 at the first light input surface 42. At least a part of the light 13 with the first spectral distribution is converted by the first luminescent light guide 4 to light 14 having a second spectral distribution. Finally, part of the light 14 having the second spectral distribution is waveguided and coupled out of the first luminescent light guide 4 at the first light exit surface 42, and is thus emitted by the light emitting device 1. By extracting the light 14 having the second spectral distribution from the first luminescent light guide 4 through one surface 42 thereof only a concentration of the light is achieved thus leading to an intensity gain.

Alternatively, but not shown, any one or more of the surfaces of the first luminescent light guide 4 other than the first light input surface 41 and the first light exit surface 42, i.e. the further surfaces 43, 44, 45, 46, may be provided with a reflective layer.

In the embodiment described above the light source 2 and the luminescent light guide are not in optical contact with the transparent heat sink element 3.

In an another example there may be an optical contact between the first light guide 4 and transparent heat sink 3 and the light 14 having the second spectral distribution will also at least partly enter and become waveguided in the transparent heat sink 3 and will exit at surfaces 35 and 42 when surfaces 36 and 46 are provided with a reflective layer.

In the following different specific embodiments of a light emitting device 1 according to the invention will be described with reference to FIGS. 12-19. Only those features differing from the general embodiment described above in relation to FIG. 11 will be described.

Figure 12:
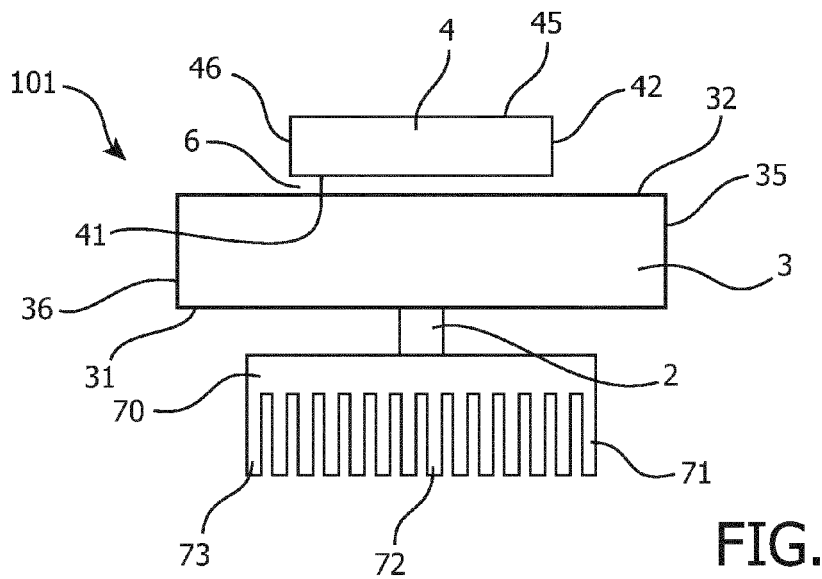
FIG. 12 shows a cross sectional side view of a light emitting device according to a second embodiment of the invention.

FIG. 12 shows a cross sectional side view of a configuration a second embodiment of a light emitting device 101 according to the invention. In this embodiment the light source 2 is arranged on a base in the form of a non-transparent heat sink 70 such as to provide for an additional heat distribution away from the first luminescent light guide 4. The non-transparent heat sink 70 comprises one or more fins 71, 72, 73 for improved heat distribution. The non-transparent heat sink 70 is preferably made of a metal having a high heat conductivity such as copper, iron or aluminum. The non-transparent heat sink 70 may also be made of a reflective ceramic such as alumina or boron nitride.

Furthermore, a gap 6 is provided between the transparent heat sink element 3 and the first luminescent light guide 4. The gap 6 has a size of e.g. less than 200 µm, less than 100 µm or less than 50 µm. The gap 6 may be an air gap maintained by means of spacer elements (not shown). The gap 6 may also be partially or completely filled with an optically transparent and thermally non-transparent material such as an optically transparent adhesive with a relatively low thermal conductivity.

Also, the light source 2 can be arranged in physical contact with the transparent heat sink element 3, in which case an improved heat distribution may be obtained even for a relatively thin transparent heat sink element 3. Thus, in this way material may be saved and a more compact light emitting device 1 may be provided.

Figure 13:
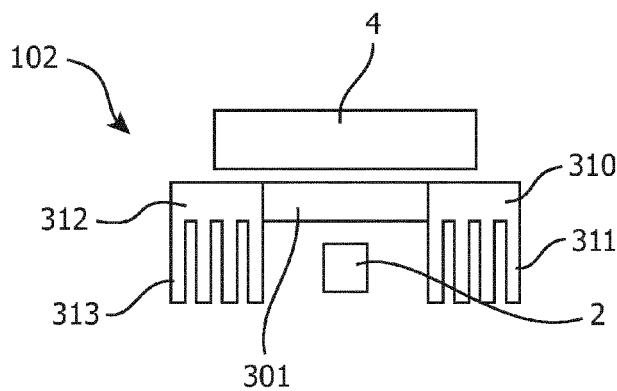
FIG. 13 shows a cross sectional side view of a light emitting device according to a third embodiment of the invention.

FIG. 13 shows a cross sectional side view of a third embodiment of a light emitting device 102 according to the invention. In this embodiment the transparent heat sink element 301 is provided with two supplementary sections 310 and 312, each comprising fins 311 and 313, respectively, extending in a direction opposite to the first luminescent light guide 4, such as to provide for an additional heat distribution away from the first luminescent light guide 4. The supplementary sections 310 and 311 are shown as transparent sections, but may in an alternative example also be non-transparent sections. If the supplementary sections 310 and 311 are non-transparent they may comprise one or more fins, and are preferably made of a metal having a relatively high heat conductivity such as copper, iron or aluminum, or of a reflective ceramic such as alumina or Boron Nitride.

Figure 14:
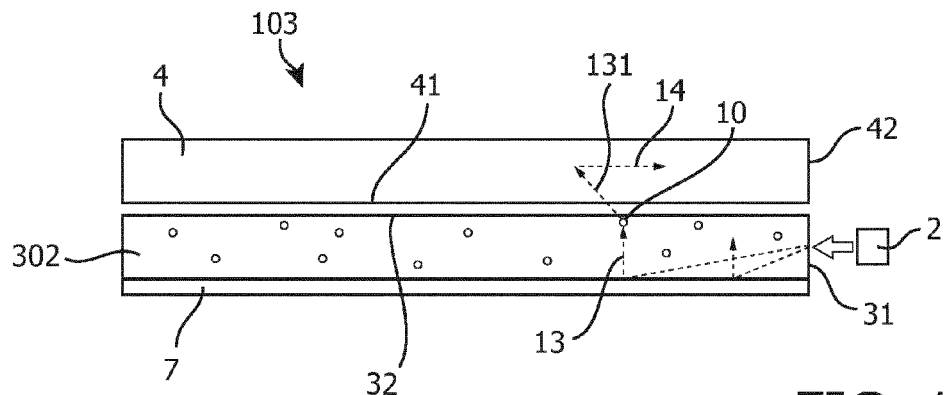
FIG. 14 shows a cross sectional side view of a light emitting device according to a fourth embodiment of the invention.

FIG. 14 shows a cross sectional side view of a fourth embodiment of a light emitting device 103 according to the invention. In this embodiment the transparent heat sink element 302 is provided with a scattering material 10 either in the transparent heat sink element or at the light input surface in the form of scattering particles for improved out-coupling of light from the transparent heat sink element 302. Furthermore, the heat sink element 302 may be provided with a coupling structure 7 shown as a layer of a suitable material for coupling light out of the transparent heat sink element 302 from the intended light out-coupling surface.

Also, in an alternative, the transparent heat sink may be in contact with a non-transparent heat sink via a highly reflecting layer. The non-transparent heat sink may comprise one or more fins.

In this way two additional results are obtained. The scattering material 10 provides for that at least a part of the light 13 having a first spectral distribution becomes scattered light 131 and gets coupled out towards the luminescent first light guide 4. Instead of or in addition to the scattering material, a coupling structure 7 for coupling light out can be used. Again this enables to use the transparent heat sink element 3 as a light guide, which in turn and, as shown in FIG. 14, enables to use a side surface of the transparent heat sink element 3 as the light input surface 31 and couple light out of the transparent heat sink element 3 with the coupling structure 7 and send the light to the light exit surface 32. Thus the light emitting device 103 shown in FIG. 14 is a so-called edge lit light emitting device.

The coupling structure 7 need not necessarily be a layer as shown in FIG. 14, but may also be a suitable shape or structure, e.g. a diffractive or refractive structure, provided on a surface of the transparent heat sink element 302. Also, coupling structures may be used for improved coupling of light out of the transparent heat sink element 302.

Alternatively or in addition thereto, and particularly in embodiments with a second transparent heat sink element as described in relation to FIG. 17 below, the light guide 4 may also be provided with a scattering material and/or a coupling structure.

Figure 15:
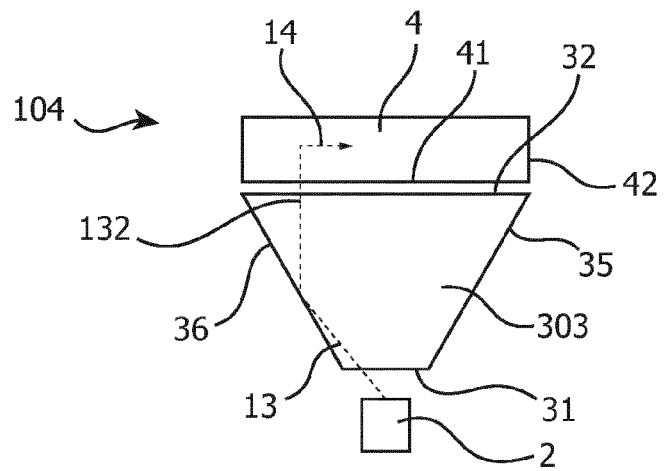
FIG. 15 shows a cross sectional side view of a light emitting device according to a fifth embodiment of the invention.

FIG. 15 shows a cross sectional side view of a fifth embodiment of a light emitting device 104 according to the invention. In this embodiment the transparent heat sink element 303 is provided with a generally trapezoid cross-sectional shape having two oppositely tapered side surfaces 35 and 36. In this way the transparent heat sink element 303 functions as an optical component redirecting the light 13 by means of refraction, in which the in this way refracted light 132 is transmitted to the first luminescent light guide 4. Thereby the amount of light lost during transmission through the transparent heat sink element is decreased. It is noted that other cross sectional shapes of the transparent heat sink element, such as for example a cross-sectional shape with parabolic side surfaces, are also feasible.

Figure 16:
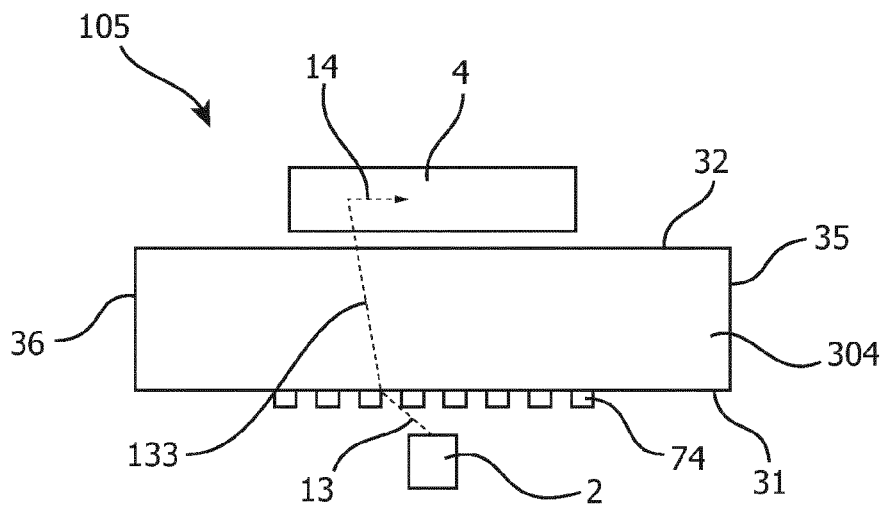
FIG. 16 shows a cross sectional side view of a light emitting device according to a sixth embodiment of the invention.

FIG. 16 shows a cross sectional side view of a sixth embodiment of a light emitting device 105 according to the invention. In this embodiment the transparent heat sink element 304 is provided with a refractive and/or diffractive structure 74 arranged on the light input surface 31. Alternatively, the refractive and/or diffractive structure 74 may be embedded in the light input surface 31. In this way the transparent heat sink element 303 functions as an optical component redirecting the light 13 by means of diffraction, in which the in this way diffracted light 133 is transmitted to the first luminescent light guide 4. Thus, the refractive and/or diffractive element 74 improves the incoupling of light such that the amount of light lost during transmission through the transparent heat sink element is decreased.

In other not shown embodiments, a refractive and/or diffractive structure may also or alternatively be arranged on any of the other surfaces of the transparent heat sink element 3, or on a surface of the first luminescent light guide 4.

Figure 17:
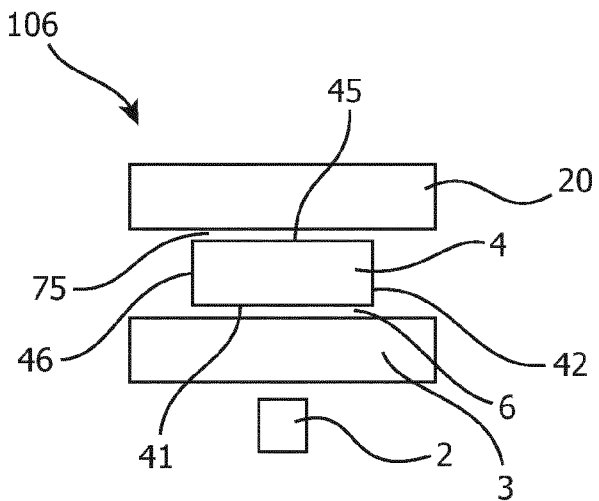
FIG. 17 shows a cross sectional side view of a light emitting device according to a seventh embodiment of the invention.

FIG. 17 shows a cross sectional side view of a seventh embodiment of a light emitting device 106 according to the invention. In this embodiment a second transparent heat sink element 20 is provided adjacent to a surface 45 of the first luminescent light guide 4 which is opposite to the light input surface 41. In other more general words the second transparent heat sink element 20 is arranged adjacent to or on a side of the first luminescent light guide 4 opposite the transparent heat sink element 3. Thereby the first luminescent light guide 4 is arranged between two transparent heat sink elements 3 and 20. This provides for a further improved distribution of heat away from the first luminescent light guide 4.

The second transparent heat sink element 20 may be rod, bar or plate shaped e.g. with a rectangular or square shaped cross section, or it may in principle have any other suitable shape.

In this example a gap 6 is provided between the transparent heat sink element 3 and the first luminescent light guide 4. The gap 6 has a size of e.g. less than 200 µm, less than 100 µm or less than 50 µm. The gap 6 may be an air gap maintained by means of spacer elements (not shown). The gap 6 may also be partially or completely filled with an optically transparent but thermally non-transparent material such as an optically transparent and thermally non-transparent adhesive.

Preferably a similar gap 75 is provided between the second transparent heat sink element 20 and the first luminescent light guide 4. The gap 75 has a size of e.g. less than 200 µm, less than 100 µm or less than 50 µm. The gap 75 may be an air gap maintained by means of spacer elements (not shown). The gap 75 may also be partially or completely filled with an optically transparent but thermally non-transparent material such as an optically transparent and thermally non-transparent adhesive.

In this embodiment it may furthermore be possible to omit the first transparent heat sink element 3 and/or one or both gaps 6, 75.

Figure 18:
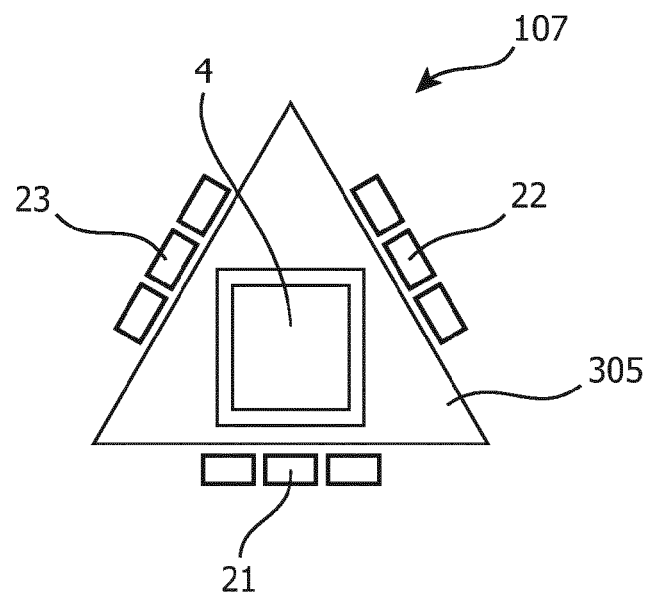
FIG. 18 shows a cross sectional end view of a light emitting device according to an eighth embodiment of the invention.

FIG. 18 shows a cross sectional end view of an eighth embodiment of a light emitting device 107 according to the invention. In this embodiment the first luminescent light guide 4 is enclosed, by the transparent heat sink element 305, i.e. the transparent heat sink element 305 is extending adjacent to four sides of the first luminescent light guide 4.

Furthermore, the transparent heat sink element 305 is provided with a triangular cross sectional shape. It is noted that the transparent heat sink element may in principle be provided with any cross sectional shape and/or surface shape irrespective of the embodiment.

Furthermore, light sources 21, 22, 23 are provided on all three sides of the transparent heat sink element 3, which is thus illuminated from three different angles. In principle any desired number of light sources may be arranged to illuminate the transparent heat sink element from any desired number of different angles as long as the required light output is achieved. Thereby more light may be coupled into the first luminescent light guide 4, thus leading to an even higher intensity gain. The transparent heat sink element may be attached to a non transparent heat sink with higher heat conductivity.

Figure 19:
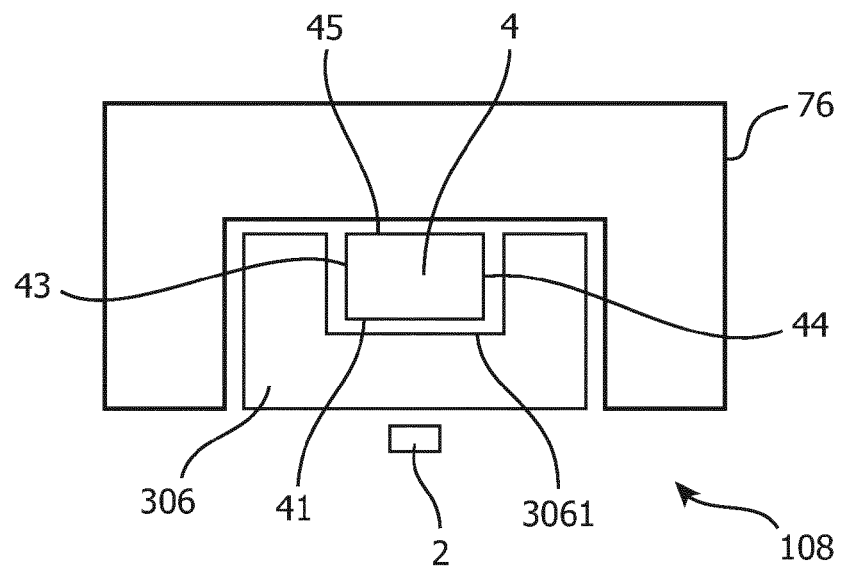
FIG. 19 shows a cross sectional end view of a light emitting device according to a ninth embodiment of the invention.

FIG. 19 shows a cross sectional end view of a ninth embodiment of a light emitting device 108 according to the invention. In this embodiment the first luminescent light guide 4 is arranged in an indentation 3061 provided in the transparent heat sink element 306. In other words, the transparent heat sink element 306 is shaped such as to enclose the light guide on three sides, i.e. the transparent heat sink element 306 is extending adjacent to the light input surface 41 and the side surfaces 43 and 44 of the first luminescent light guide 4.

Furthermore, the light emitting device 108 is provided with a non-transparent heat sink 76 arranged to enclose the first luminescent light guide 4 and the transparent heat sink element 306, i.e. the non-transparent heat sink 76 is extending adjacent to three sides for improved heat distribution. As shown, the side on which the light source 2 is arranged is extending adjacent to the non-transparent heat sink 76.

The non-transparent heat sink 76 may in alternative embodiments extend adjacent to one or two or three sides or even four sides of the first luminescent light guide 4 and the transparent heat sink element 3. The side on which the light source 2 is arranged may in principle also extend adjacent to the non-transparent heat sink 76, in which case the light source 2 is arranged on a surface of the non-transparent heat sink facing the light input surface of the transparent heat sink element 3.

The transparent heat sink element may be provided enclosing the first luminescent light guide on four sides, these four sides not including the first light exit surface.

In embodiments the light emitting device further comprises a phosphor wheel as described above in relation to FIG. 2.

In another embodiment the light emitting device is provided with an optical element at the first light exit surface as described above in relation to FIG. 3. Alternatively, or additionally, the first light exit surface of the light guide may have tapered walls as described in relation to FIG. 10 above.

In embodiments the first light guide may be shaped as described in relation to FIG. 4 and FIG. 5 above.

In embodiments a light source emitting light with another spectral distribution than the first light source may be added to the light emitting device according to the invention, for example as described in relation to FIG. 7 above.

In embodiments a heat sink element as described in relation to FIG. 8A and FIG. 8B above may be arranged on the first light guide to further improve the heat removal.

In embodiments the first light guide may be adapted to provide for polarized light, for example as described in relation to FIGS. 9A-9D above.

The light emitting device according to embodiments of the invention may be arranged in a digital project, for example as described in relation to FIG. 6 above.

The person skilled in the art realizes that the present invention by no means is limited to the preferred embodiments described above. On the contrary, many modifications and variations are possible within the scope of the appended claims.

Particularly, the various elements and features of the various embodiments described herein may be combined freely.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
   a light source adapted for, in operation, emitting light with a first spectral distribution,
   a first luminescent light guide comprising a first light input surface and a first light exit surface extending at an angle different from zero relative to each other,
   and the first luminescent light guide being adapted for receiving the light with the first spectral distribution at the first light input surface, converting at least a part of the light with the first spectral distribution to light with a second spectral distribution, guiding the light with the second spectral distribution to the first light exit surface and coupling the light with the second spectral distribution out of the first light exit surface, and
   a first transparent heat sink element arranged adjacent to at least one surface of the first luminescent light guide and in the optical path between the light source and the first luminescent light guide, the at least one surface being different from the light exit surface (42), wherein the first transparent heat sink element is adapted for redirecting light by means of any one of refraction and diffraction.

2. The light emitting device according to claim 1, wherein the first transparent heat sink element is made of a material having a thermal conductivity being larger than 1 W/(K*m).

3. The light emitting device according to claim 1, wherein one or more surfaces of the first luminescent light guide other than the first light input surface and the first light exit surface are provided with a reflective layer.

4. The light emitting device according to claim 1, wherein the first luminescent light guide is made of a luminescent material chosen from a group comprising luminescent garnets, luminescent doped garnets, transparent luminescent materials, light concentrating luminescent materials and combinations thereof.

5. The light emitting device according to claim 1, wherein a gap is provided between the first transparent heat sink element and the first luminescent light guide.

6. The light emitting device according to claim 5, wherein the gap between the first transparent heat sink element and the first luminescent light guide comprises any one or more of air and an optical adhesive.

7. The light emitting device according to claim 1, wherein the first transparent heat sink element comprises any one or more of a coupling structure, which is arranged on or at a surface extending parallel to and opposite the first light exit surface, and a scattering material.

8. The light emitting device according to claim 1, wherein the first transparent heat sink element has a trapezoid cross-sectional shape having two oppositely tapered side surfaces.

9. The light emitting device according to claim 1, wherein the first transparent heat sink element extends adjacent to at least two surfaces of the first luminescent light guide.

10. The light emitting device according to claim 9, wherein the first transparent heat sink element is extending adjacent four sides of the first luminescent light guide and has a triangular cross-sectional shape and in which light sources are provided on all three sides of the first transparent heat sink element.

11. The light emitting device according to claim 1, wherein the transparent material of the first transparent heat sink element is chosen from the group comprising sapphire, undoped transparent garnets, such as YAG, LuAG, glass, quartz, ceramic materials such as alumina, luminescent materials, phosphors and combinations thereof.

12. The light emitting device according to claim 1, further comprising a second transparent heat sink element arranged adjacent a surface of the first luminescent light guide which is facing away from said first transparent heat sink element.

13. The light emitting device according to claim 1, wherein the light source is arranged on a base, the base being a non-transparent heat sink.

14. The light emitting device according claim 1, wherein a non-transparent heat sink is provided arranged in any one or more of physical and thermal contact with any one or more of the first transparent heat sink element and the first luminescent light guide.

15. A projector, a lamp or a luminaire comprising a light emitting device according to claim 1.

* * * * *